(12) United States Patent
Kojima et al.

(10) Patent No.: US 10,840,634 B2
(45) Date of Patent: Nov. 17, 2020

(54) WIRING HARNESS

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hisashi Kojima, Mie (JP); Yasuo Omori, Mie (JP); Shunya Takeuchi, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 16/487,474

(22) PCT Filed: Feb. 1, 2018

(86) PCT No.: PCT/JP2018/003422
§ 371 (c)(1),
(2) Date: Aug. 21, 2019

(87) PCT Pub. No.: WO2018/155124
PCT Pub. Date: Aug. 30, 2018

(65) Prior Publication Data
US 2020/0006888 A1    Jan. 2, 2020

(30) Foreign Application Priority Data

Feb. 22, 2017 (JP) ................................ 2017-030773

(51) Int. Cl.
*H01R 13/58* (2006.01)
*H01B 13/012* (2006.01)
*H02G 3/04* (2006.01)

(52) U.S. Cl.
CPC ....... *H01R 13/58* (2013.01); *H01B 13/01272* (2013.01); *H02G 3/04* (2013.01)

(58) Field of Classification Search
CPC ....... H01R 13/58; H01R 13/582; H01R 12/00
(Continued)

(56) References Cited

U.S. PATENT DOCUMENTS 2,339,409 A * 1/1944 Joy .................. H05B 3/342
219/527
3,778,590 A * 12/1973 Iizuka .................. B63C 11/28
219/211
(Continued)

FOREIGN PATENT DOCUMENTS

| JP | 10-74565 | 3/1998 |
|----|----------|--------|
| JP | 2006-196227 | 7/2006 |
| JP | 2013-020800 | 1/2013 |

OTHER PUBLICATIONS

International Search Report dated Apr. 17, 2018.

*Primary Examiner* — Peter G Leigh
(74) *Attorney, Agent, or Firm* — Gerald E. Hespos; Michael J. Porco; Matthew T. Hespos

(57) ABSTRACT

A wiring harness includes wires (10), terminal fittings (20) connected respectively to end parts of the wires (10), and a sheet (30) to which the wires (10) and at least a part of the terminal fittings (20) along which the wires (10) are disposed are sewn by a sewing thread (T). Accordingly, the wires (10) cannot be pulled singly. Further, if the wires (10) are pulled together with the sheet (30), a pulling force is dispersed to the wire (10) and the sheet (30) so that the pulling force on the wire (10) is reduced. In addition, since at least a wire arranging portion (23) of the terminal fitting (20) along which the wire (10) is disposed is sewn to the (Continued)

sheet (30) by the sewing thread (T), detachment of the wire (10) from the terminal fitting (20) is prevented.

13 Claims, 39 Drawing Sheets

(58) Field of Classification Search
USPC .......................................................... 439/449
See application file for complete search history.

(56) References Cited

U.S. PATENT DOCUMENTS

| | | | | | |
|---|---|---|---|---|---|
| 4,082,402 | A | * | 4/1978 | Kinkaid | H01R 4/2495 439/422 |
| 4,179,319 | A | * | 12/1979 | Lofdahl | B29C 61/0608 156/86 |
| 5,727,971 | A | | 3/1998 | Junkins et al. | |
| 6,350,129 | B1 | * | 2/2002 | Gorlick | H01R 4/48 439/37 |
| 7,047,636 | B2 | * | 5/2006 | Onuma | H01R 12/68 29/432.1 |
| 7,410,384 | B2 | * | 8/2008 | Shuey | H01R 12/68 439/421 |
| 7,462,035 | B2 | * | 12/2008 | Lee | H01R 12/592 439/121 |
| 8,308,489 | B2 | * | 11/2012 | Lee | H01R 13/2407 2/69 |
| 2006/0128169 | A1 | * | 6/2006 | Marmaropoulos | H01R 13/193 439/37 |
| 2010/0276497 | A1 | * | 11/2010 | Seban | H01Q 1/2208 235/492 |

* cited by examiner

WIRING HARNESS

BACKGROUND

Field of the Invention

The invention relates to a wiring harness.

Related Art

Japanese Unexamined Patent Publication No. 2006-196227 discloses a wiring harness that includes a plurality of wires. Terminal fittings are connected to end parts of the wires and are accommodated into cavities of a housing. The terminal fittings are locked primarily by locking lances projecting into the respective cavities and secondarily by a side retainer. In this way, the terminal fitting is not easily withdrawn even if the wire extending outward from the housing is pulled strongly.

However, in the wiring harness described above, the wire may be cut at an intermediate position or may be detached from the terminal fitting if the wire is pulled with a strong force. Such a concern increases as the wire becomes thinner.

The invention was completed on the basis of the above situation and aims to provide a wiring harness capable of protecting wires.

SUMMARY

A wiring harness of the present invention includes a wire, a terminal fitting connected to an end part of the wire, and a sheet-like member. The wire and at least a part of the terminal fitting along which the wire is disposed are sewn to the sheet-like member.

The sewn connection of the wires to the sheet-like member prevents the wires from being pulled singly. Further, if the wire is pulled together with the sheet-like member, a pulling force is dispersed to the wire and the sheet-like member. Therefore, the pulling force acting on the wire can be reduced. In addition, at least the part of the terminal fitting also is sewn to the sheet-like member to prevent detachment of the wire from the terminal fitting. Therefore, the wire can be protected.

A plurality of the wires and a plurality of the terminal fittings may be sewn collectively to the sheet-like member. Thus, the wires and the terminal fittings can be handled collectively. This configuration is advantageous particularly when individual handling of the wires and the terminal fittings is difficult because the wires are thin and the terminal fittings are small.

The wiring harness may include a housing for accommodating the terminal fitting. Additionally, the housing and the sheet-like member may include locking structures to be fit and locked to each other. According to this configuration, a pulling force acting on the wire(s) and the sheet-like member is transferred to the housing, thereby further reducing a pulling force acting on the wire(s).

The wiring harness of the may include a housing for accommodating the terminal fitting, and the housing may be sewn to the sheet-like member. According to this configuration, a pulling force acting on the wire(s) and the sheet-like member is transferred to the housing, thereby further reducing a pulling force acting on the wire(s).

DETAILED DESCRIPTION

A first embodiment of the invention is described in detail with reference to FIGS. 1 to 25.

Figure 2:
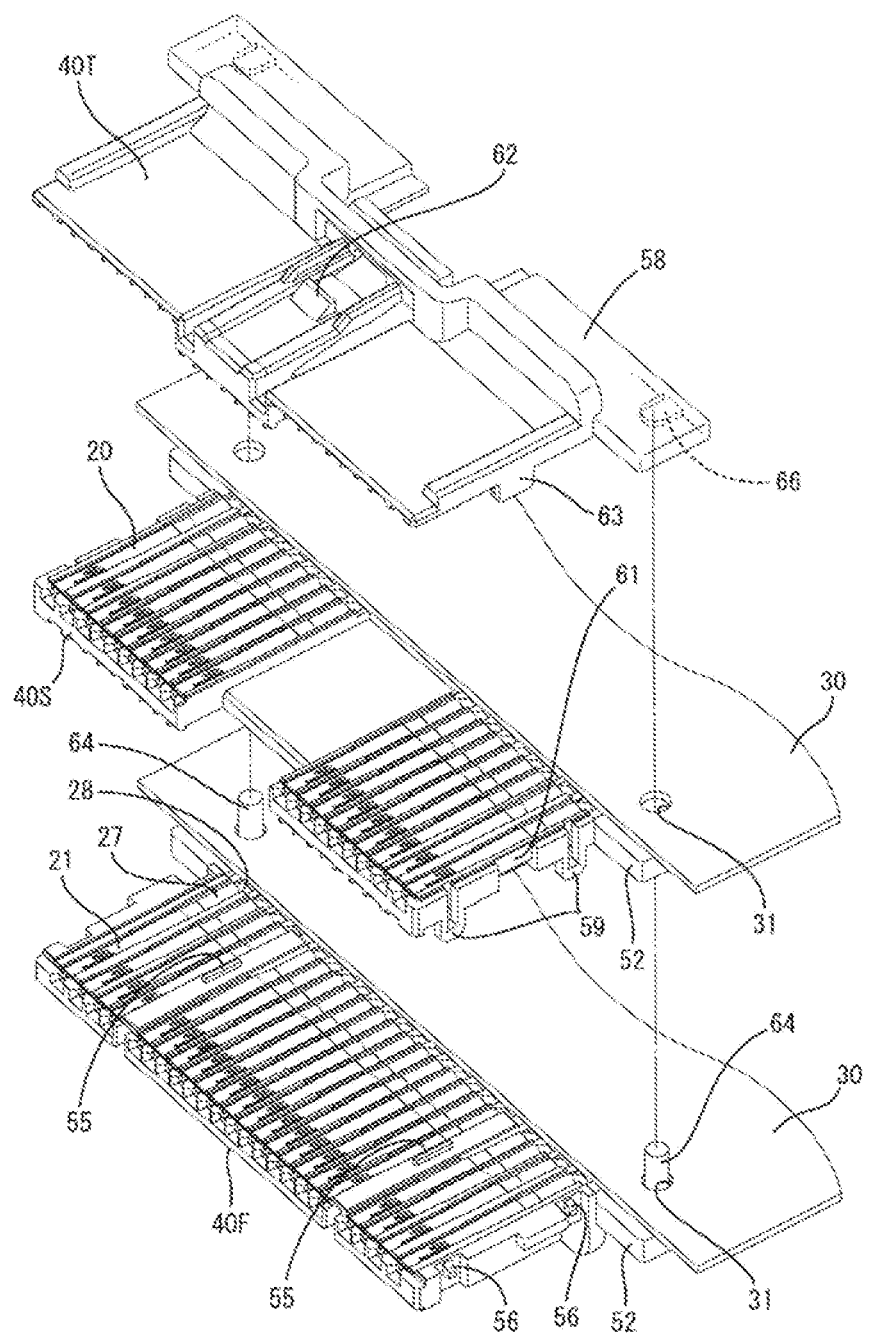
FIG. 2 is an exploded perspective view showing the end part of the wiring harness.

A wiring harness in this embodiment is used as a wiring for a vehicle or the like. The wiring harness includes wires 10, a terminal fitting 20 is connected to an end part of each wire 10, and the wires 10 and at least parts of the terminal fittings 20 along which the wires 10 are disposed (hereinafter, referred to as wire arranging portions 27) are sewn to sheets 30. Further, the wiring harness includes a housing 40 for accommodating the terminal fittings 20. In the following description, an upper side, a lower side, an oblique left-lower side and an oblique right-upper side of FIG. 2 are referred to respectively as an upper side, a lower side, a front and a rear for each constituent member.

The sheet 30 is formed of a sheet material, such as PVC, PP or nonwoven fabric. The sheet 30 is flame retardant and wear-resistant.

The sheet 30 is a substantially rectangular sheet and has a width so that the terminals 20 and the wires 10 can be collectively sewn. The terminal fittings 20 and the wires 10 are disposed on a lower surface side (one surface side) of the sheet 30 and sewn.

The wire 10 includes a core 11 and an insulation coating 12 covering the core 11. The core 11 is a twisted wire or a single-core wire formed of a conductive material such as copper or aluminum. The wire 10 is a thin wire having a small diameter.

Figure 7:
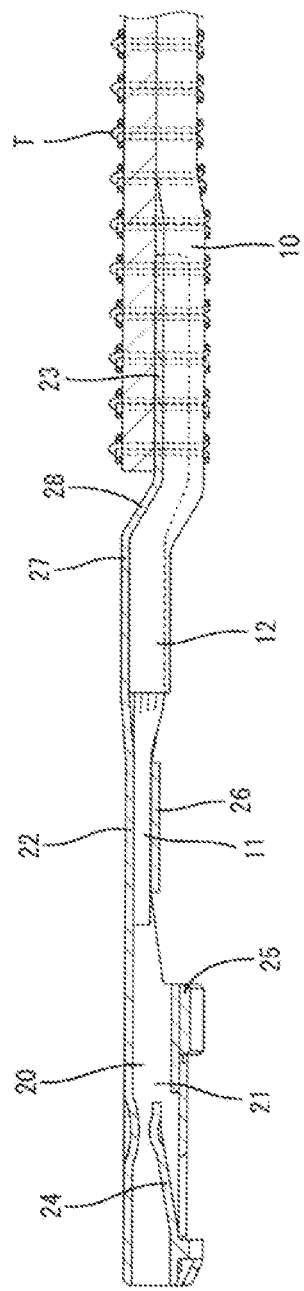
FIG. 7 is a section showing the sheet-like member in the state where the wires and the terminal fittings are sewn thereto.

The terminal fitting 20 includes a terminal body 21 to be connected to an unillustrated mating terminal fitting, a connecting portion 22 to be connected to the wire 10 and a terminal sewing portion 23 to be sewn to the sheet-like member 30 (see FIG. 7).

The terminal body 21 is a rectangular tube, and a resilient contact piece 24 is provided inside the terminal body 21 for resiliently contacting the unillustrated mating terminal fitting. The terminal body 21 is provided with a lock receiving portion 25 to which a retaining portion 42 of the housing 40 is locked from behind. The lock receiving portion 25 is provided on a rear end part of the terminal body 21 and projects on the lower surface of the terminal body 21.

The connecting portion 22 is connected to the core 11 exposed at an end part of the wire 10. The connecting portion 22 includes two barrel pieces 26 cantilevered toward a lower surface side. The barrel pieces 26 are crimped to the core 11 disposed on the lower surface of the connecting portion 22.

Figure 8:
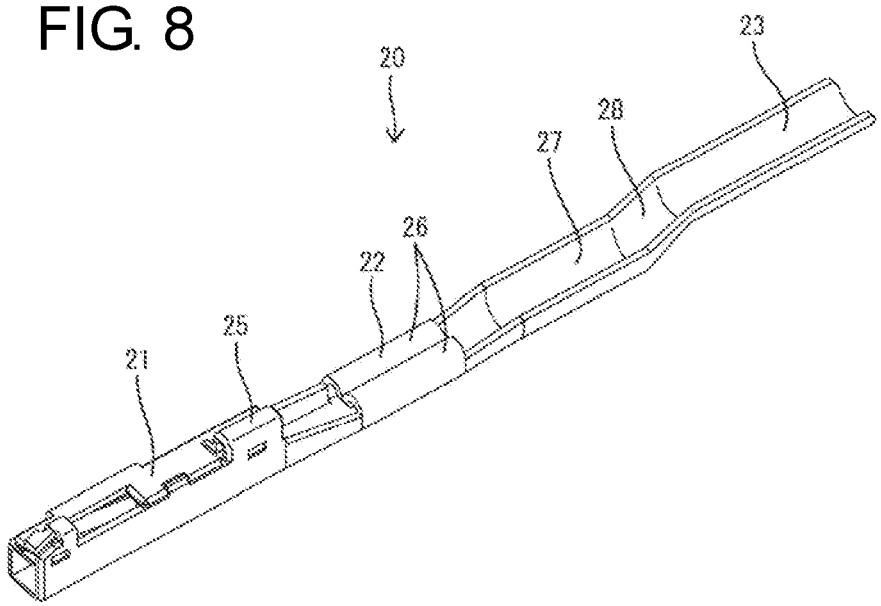
FIG. 8 is a perspective view showing the terminal fitting.
Figure 9:
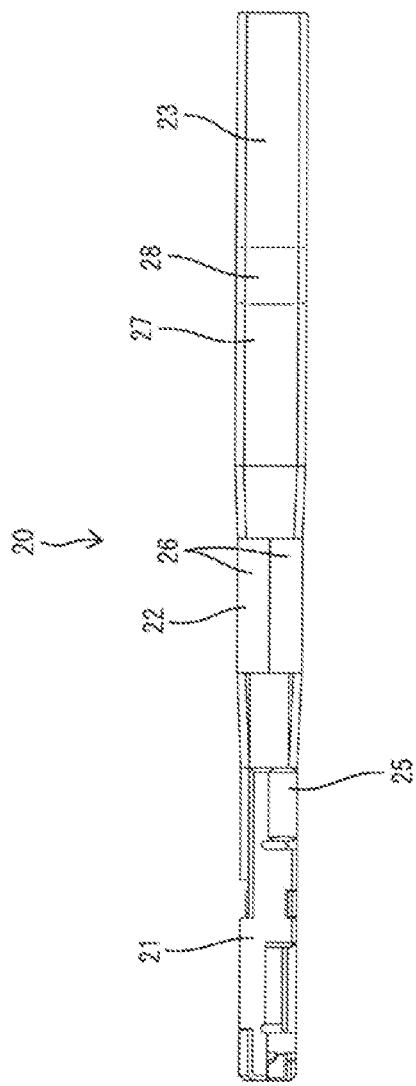
FIG. 9 is a plan view showing the terminal fitting.

The wire arranging portion 27 along which the wire 10 is disposed is provided behind the connecting portion 22. As shown in FIG. 8, the wire arranging portion 27 has a U-shaped cross-section (semicircular cross-section) open toward the side where the wire 10 is disposed, and extends along the outer peripheral surface of the insulation coating 12 of the wire 10.

Figure 10:
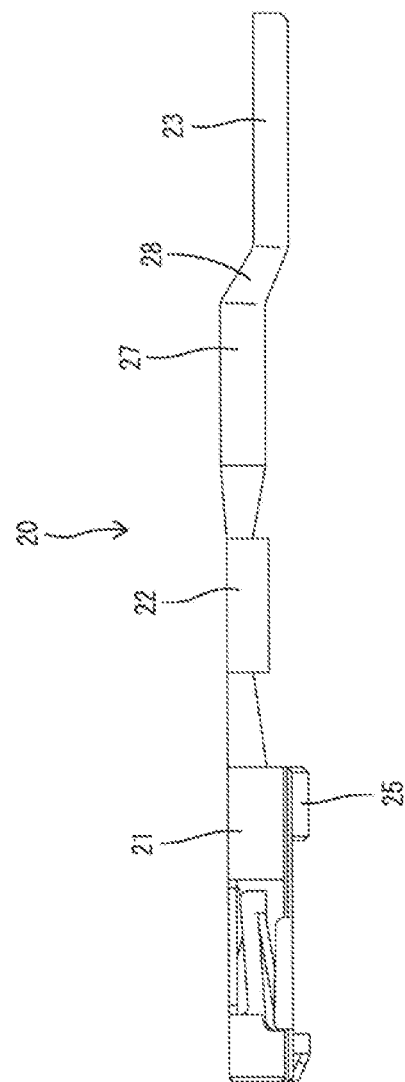
FIG. 10 is a side view showing the terminal fitting.

A step 28 is provided in an intermediate part of the wire arranging portion 27 and slightly shifts a rear part toward the side, where the wire 10 is disposed, with respect to a front part (see FIG. 10). The step 28 is inclined with respect to a front-rear direction and vertically shifts the front and rear parts of the wire arranging portion 27 by a dimension equal to a thickness of the sheet 30.

A part of the wire arranging portion 27 behind the step 28 serves as the terminal sewing portion 23. The terminal sewing portion 23 extends substantially parallel to an axis of the terminal body 21. The sheet 30 is disposed on a side (upper side of FIG. 7) of the terminal sewing portion 23 opposite to the side where the wire 10 is disposed. The height of the upper surface of the sheet 30 sewn to the terminal sewing portion 23 is aligned with that of substantially the entire upper surface of a part of the terminal fitting 20 before the step 28. In other words, in a state where the sheet 30 is sewn to the terminal sewing portion 23, vertical dimensions of a rear part (terminal sewing portion 23) and a front part (terminal body 21) of the terminal fitting 20 are equal.

The terminal fittings 20 and the wires 10 are sewn to the sheet 30 by a sewing thread T. The sewing thread T is desirably a member more easily bendable than the wires 10 and preferably has a higher tensile strength than the wires 10. The sewing thread T may be made of natural fibers or chemical fibers and preferably has a high wear resistance, such as nylon and polyester. Further, the sewing thread T may be a wire including an enamel wire. The sewing thread T may be a single thread or a twisted thread.

As shown in FIG. 7, the terminal fitting 20 and the wire 10 are sewn to the sheet-like member 30 from the rear part of the terminal fitting 20 to the wire 10. A part of the wire 10 disposed in the terminal sewing portion 23 is sewn to the sheet-like member 30 together with the terminal sewing portion 23. In this way, the wire 10 is held in a state fit in the wire arranging portion 27. Further, the wire 10 is sewn to the sheet 30 at a plural positions in an extending direction of the wire 10.

The sewing thread T extends along the upper surface of the sheet 30 and partially exits toward the lower surface side of the sheet 30 to form rings. The terminal fitting 20 and the wire 10 are sewn to the sheet 30 by being inserted through the rings.

Figure 6:
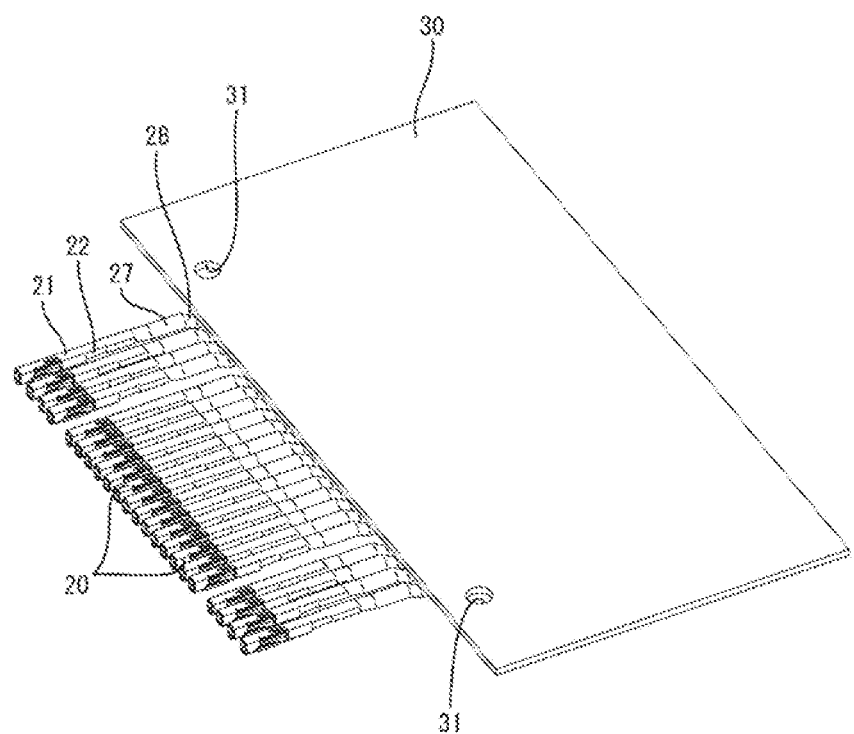
FIG. 6 is a perspective view showing the sheet-like member in a state where wires and terminal fittings are sewn thereto.

As shown in FIG. 6, a plurality of the wires 10 and a plurality of the terminal fittings 20 are sewn collectively to the sheet 30. The terminal fittings 20 are arranged along the front edge (outer edge) of the sheet 30. The terminal fittings 20 are disposed substantially perpendicular to the front edge of the sheet 30. The front parts of the terminal fittings 20 including the steps 28 project forward from the front edge of the sheet 30.

As shown in FIG. 2, as many sheets 30 as stages of cavities 41 are provided. The terminal fittings 20 and the wires 10 arranged in the cavities 41 of each stage are collectively sewn to each sheet 30. The terminal fittings 20 arranged in parallel are spaced apart by a distance corresponding to an interval between the cavities 41 of the housing 40. In this embodiment, two sheets 30 are provided in correspondence with the cavities 41 in two upper and lower stages. The two sheets 30 are shaped identically.

Each sheet 30 is provided with a locking structure K to be locked to the housing 40. The locking structure K is described in detail later.

Figure 1:
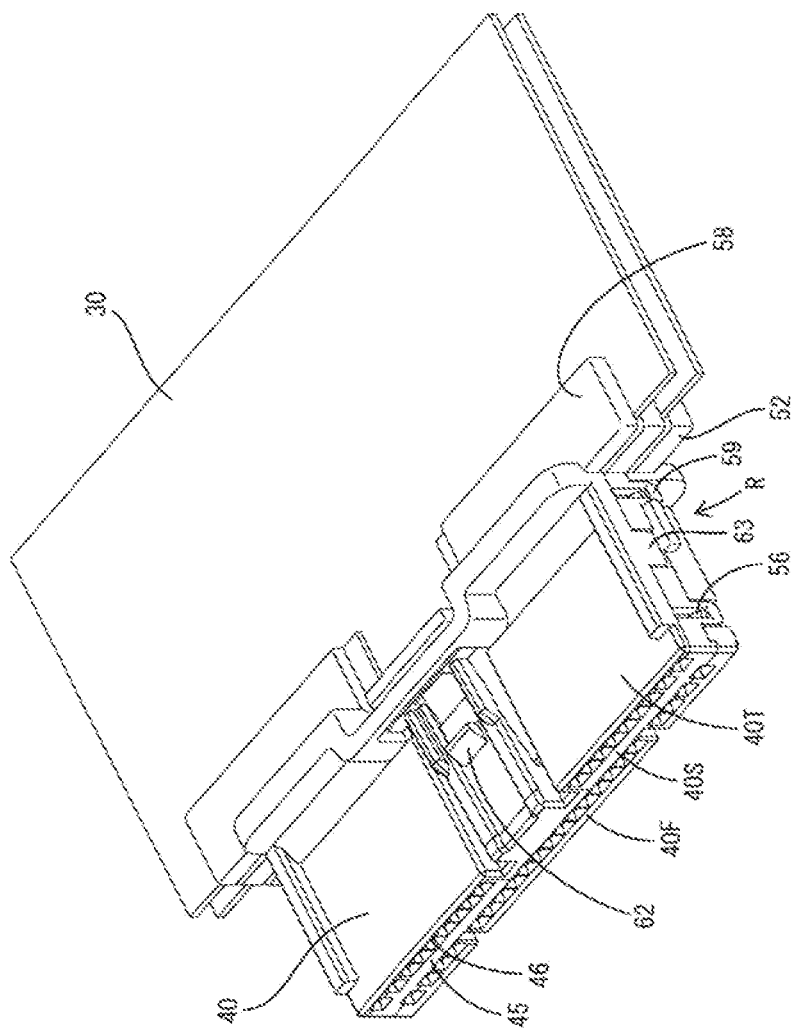
FIG. 1 is a perspective view showing an end part of a wiring harness in a first embodiment.

The housing 40 is made of synthetic resin and has, as shown in FIG. 1, a wide flat shape. The housing 40 is provided with the cavities 41 for individually accommodating the terminal fittings 20. The cavities 41 are provided in stages (two stages in this embodiment) in a vertical direction, and the cavities 41 in each stage are disposed laterally side by side. The cavities 41 in the lower stage are provided substantially over the entire width of the housing 40, and the cavities 41 in the upper stage are provided on both left and right sides except in a widthwise intermediate part of the housing 40.

Figure 4:
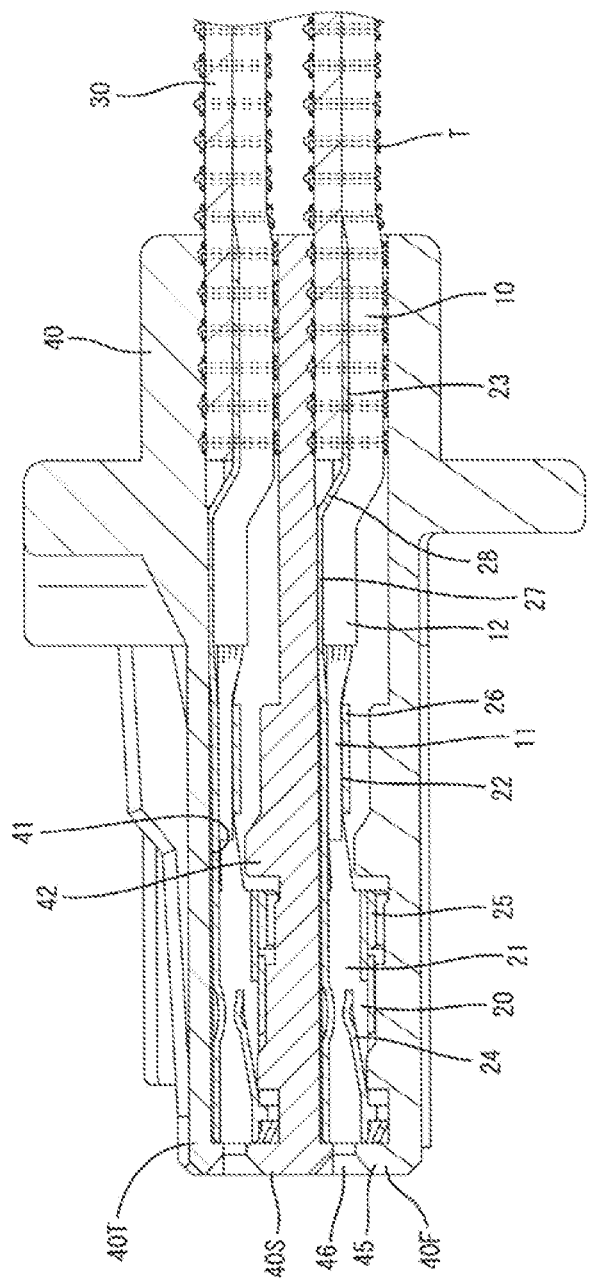
FIG. 4 is a section showing the end part of the wiring harness.

As shown in FIG. 4, the retaining portion 42 for retaining the terminal fitting 20 is provided on a bottom wall of each cavity 41. The retaining portion 42 is integral to the bottom wall and forms a block projecting slightly farther up than other parts. The front surface of the retaining portion 42 is to be locked to the lock receiving portion 25 of the terminal fitting 20 and is substantially orthogonal to the front-rear direction.

Figure 3:
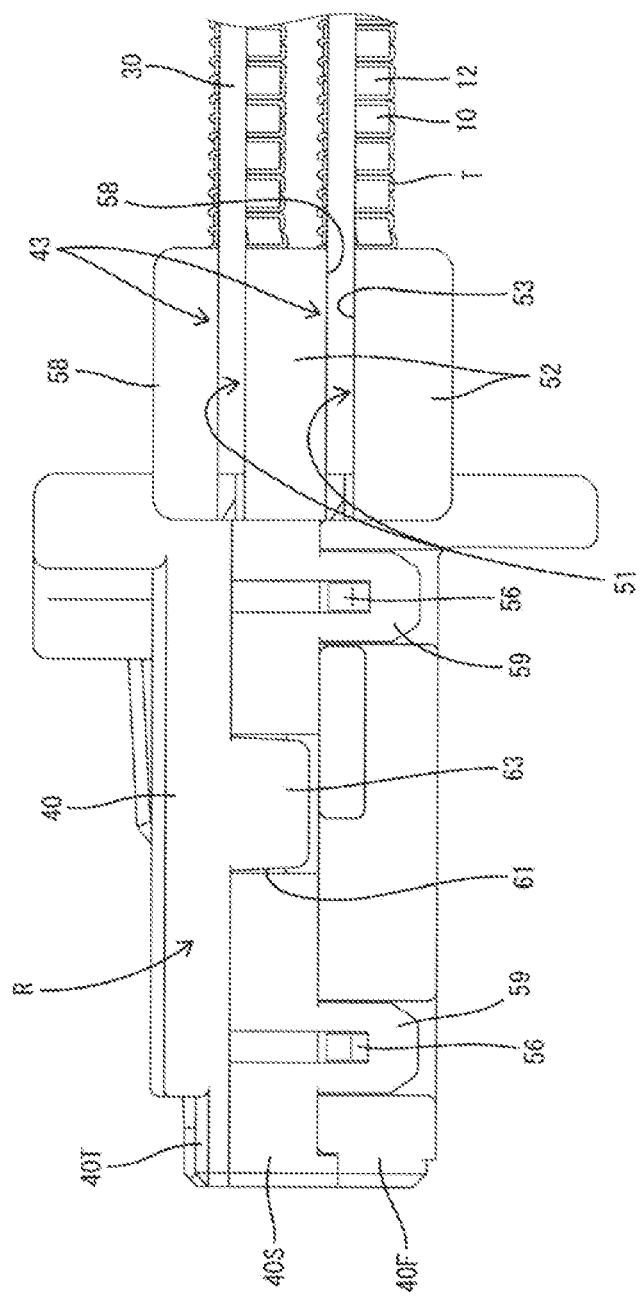
FIG. 3 is a side view showing the end part of the wiring harness.

As shown in FIG. 3, the housing 40 includes sheet sandwiching portions 43 for vertically sandwiching front edge parts of the sheets 30. The sheet sandwiching portions 43 are provided in a rear end part of the housing 40 and are described in detail later.

As shown in FIG. 2, the housing 40 is split vertically at positions of the cavities 41 in the respective stages. With the housing 40 split, upper surface sides of the cavities 41 are open. The housing 40 includes a first split housing 40F in a lower stage, a second split housing 40S in a middle stage and a third split housing 40T in an upper stage. Each of the first, second and third split housings 40F, 40S and 40T is in the form of a substantially flat plate. The housing 40 includes lock structures R for locking the first, second and third split housings 40F, 40S and 40T in a together (see FIG. 3). The lock structures R are provided on both left and right side surfaces of the housing 40.

Figure 11:
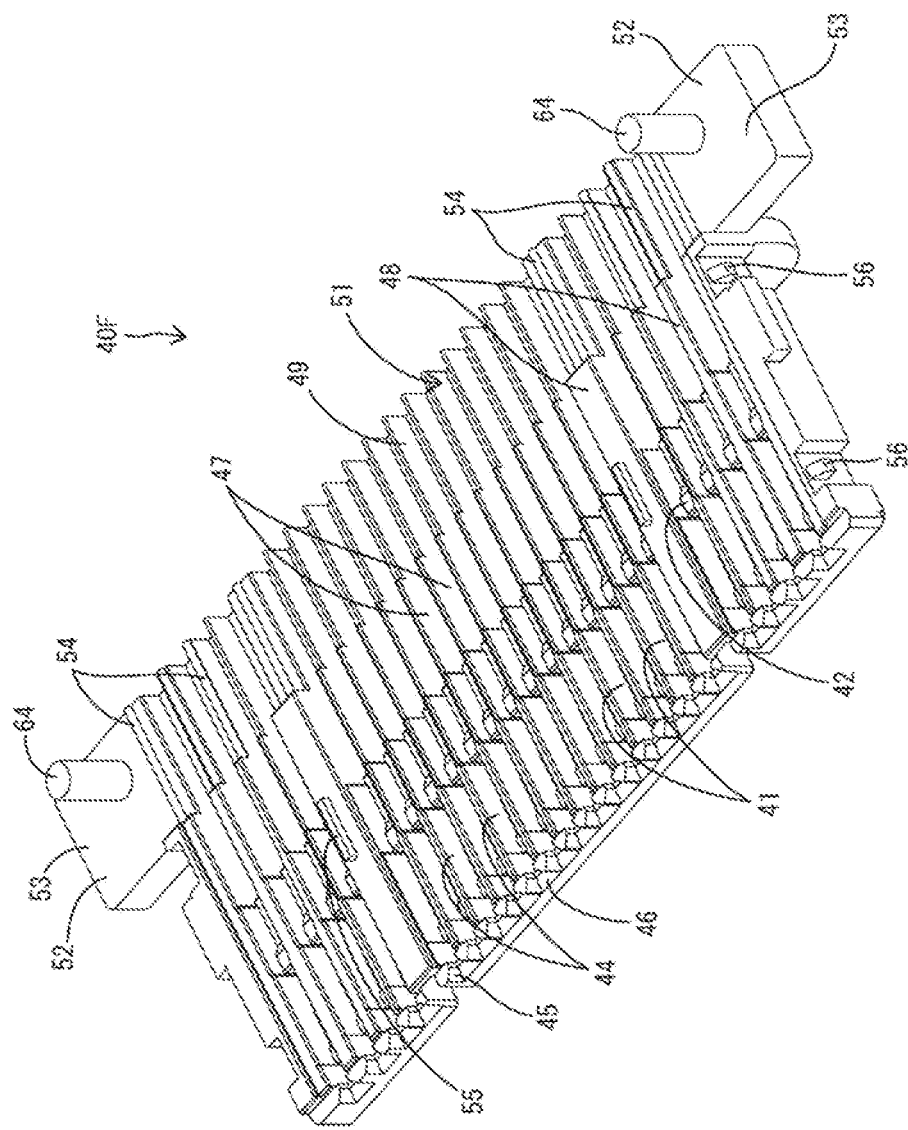
FIG. 11 is a perspective view showing a first split housing.
Figure 12:
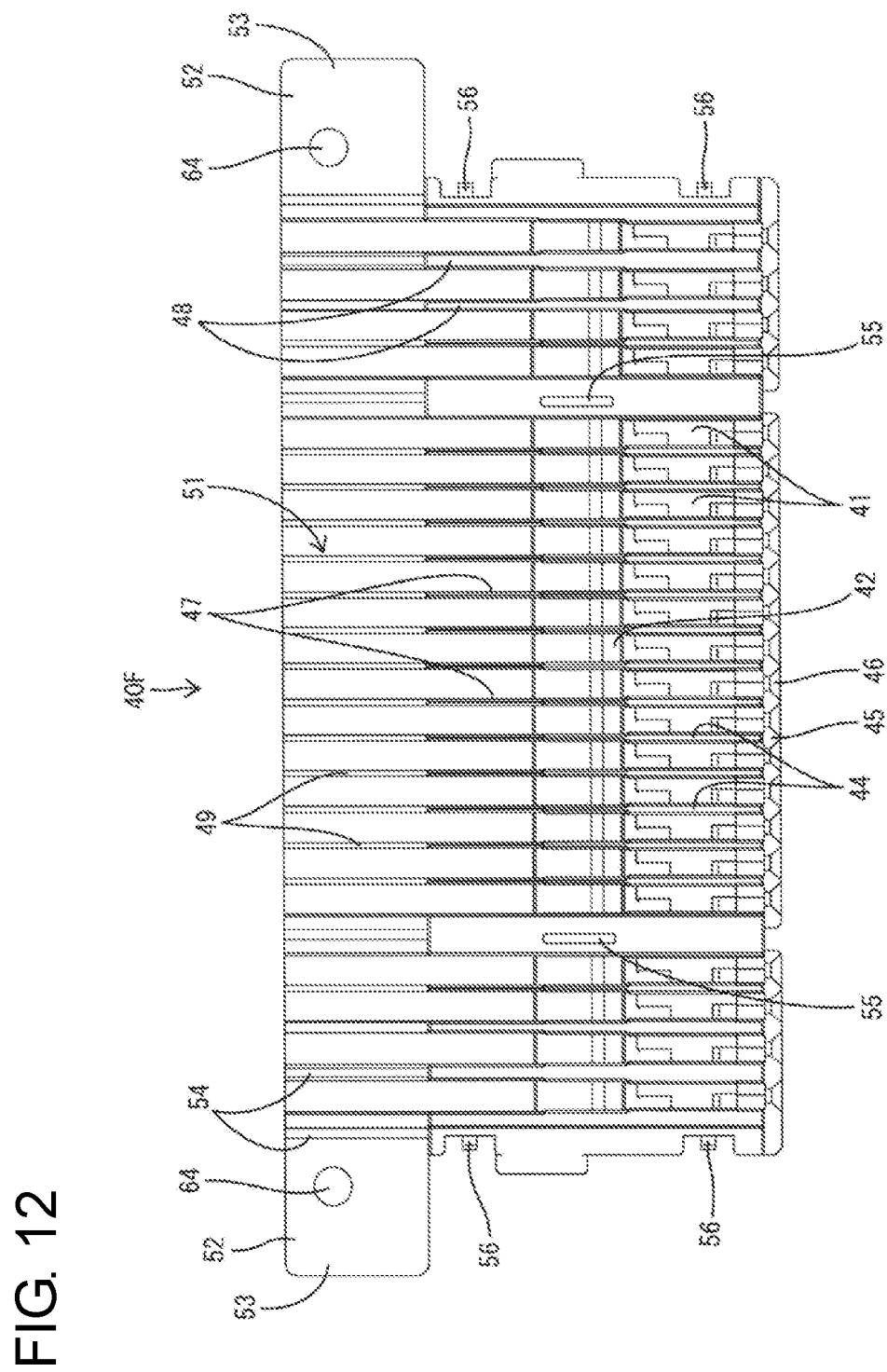
FIG. 12 is a plan view showing the first split housing.

As shown in FIG. 11, partition walls 44 stand on the upper surface of the first split housing 40F for partitioning between the cavities 41 in the lower stage, and front walls 45 of the cavities 41 stand on the upper surface of the first split housing 40F.

Figure 13:
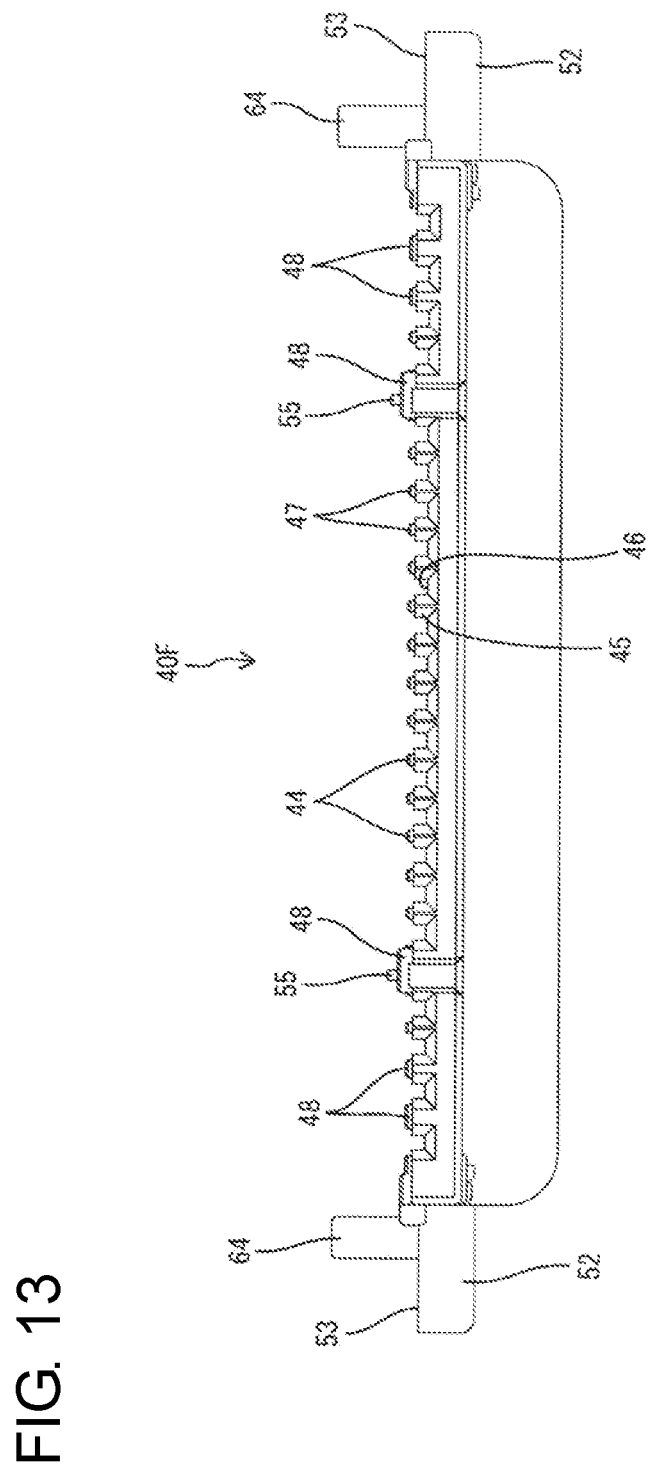
FIG. 13 is a front view showing the first split housing.
Figure 14:
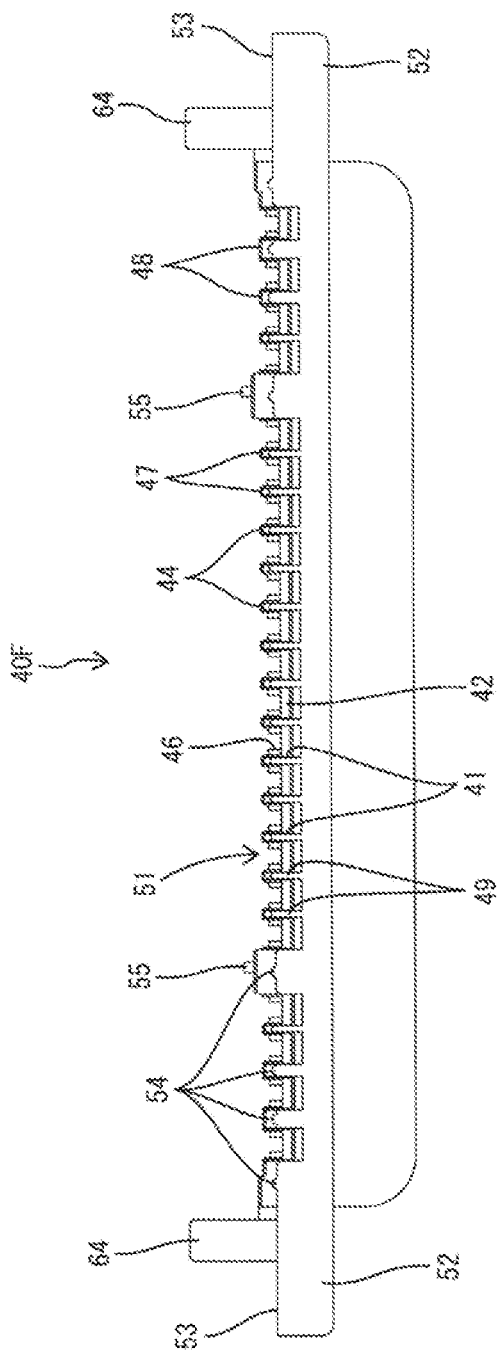
FIG. 14 is a back view showing the first split housing.
Figure 15:
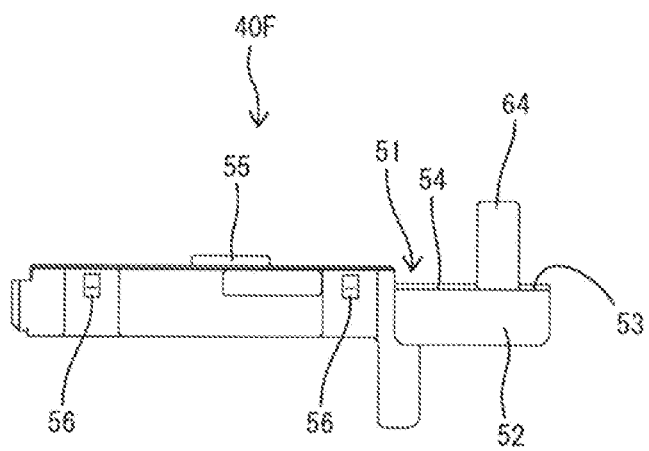
FIG. 15 is a side view showing the first split housing.

As shown in FIG. 13, the front walls 45 have a smaller height than the partition walls 44, and terminal insertion openings 46 are open on an upper surface for receiving the mating terminal fittings 20.

A rear end part of the partition wall 44 is formed into a lower wall 49 having a slightly smaller height than a front part, as shown in FIG. 11. Upper sides of the lower walls 49 serve as a sheet arranging portion 51 on which the sheet 30 is arranged.

The partition walls 44 include thin walls 47 disposed in parts where intervals between adjacent cavities 41 are narrow and thick walls 48 disposed in parts where intervals between adjacent cavities 41 are wide. The upper surfaces of the lower walls 49 of the thick walls 48 are disposed at a position slightly lower than the upper surfaces of the lower walls 49 of the thin walls 47 (see FIG. 14).

Bulging portions 52 having a rectangular shape in a plan view and laterally protruding substantially in a horizontal direction are provided on a rear end part of the first split housing 40F. The bulging portions 52 are provided on both left and right sides of the first split housing 40F. The upper surfaces of the bulging portions 52 are flat surfaces serving as sheet placing surfaces 53 on which the sheet-like member 30 is placed. The sheet placing surfaces 53 are disposed at a position slightly lower than the upper ends of the lower walls 49 of the thin walls 47. Upper sides of the sheet placing surfaces 53 constitute parts of the sheet arranging portion 51.

As shown in FIG. 11, protrusions 54 project on the upper surfaces of the sheet placing surfaces 53 and the lower walls 49 of the thick walls 48 and are long in the front-rear direction. The upper ends of the protrusions 54 and those of the lower walls 49 of the thin walls 47 are at the same height (see FIG. 14). The protrusions 54 and the lower walls 49 of the thin walls 47 support the sheet-like member 30 disposed on the sheet arranging portion 51.

Positioning ribs 55 project on the upper surface of the first split housing 40F for positioning the second split housing 40S. The positioning ribs 55 stand on the upper surfaces of the thick walls 48. Two of the positioning ribs 55 are provided while being spaced apart in a width direction (lateral direction) of the first split housing 40F. Each positioning rib 55 is long in the front-rear direction.

Lock projections 56 constituting the lock structures R are provided on left and right side surfaces of the first split housing 40F. Two of the lock projections 56 are provided on each of front and rear sides of the first split housing 40F.

Figure 16:
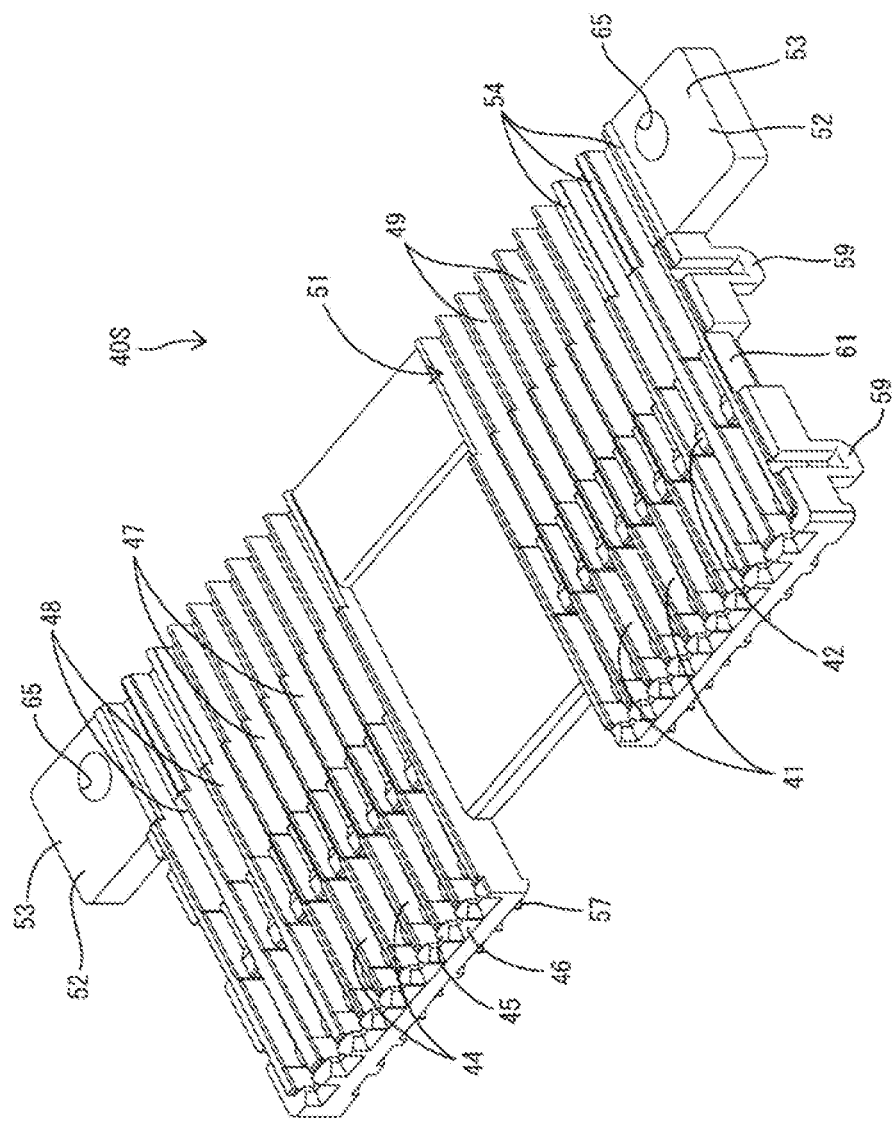
FIG. 16 is a perspective view showing a second split housing.
Figure 17:
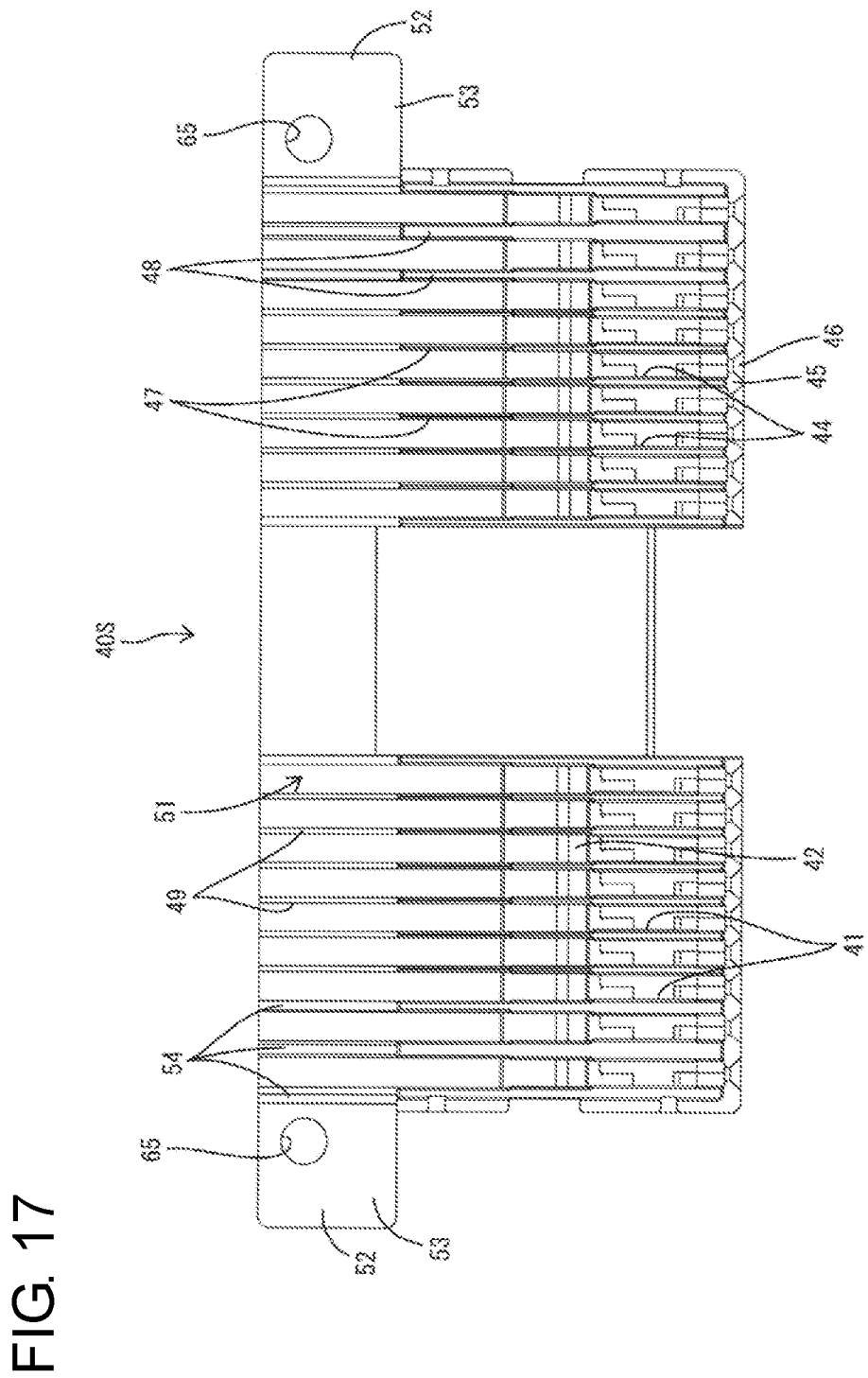
FIG. 17 is a plan view showing the second split housing.
Figure 18:
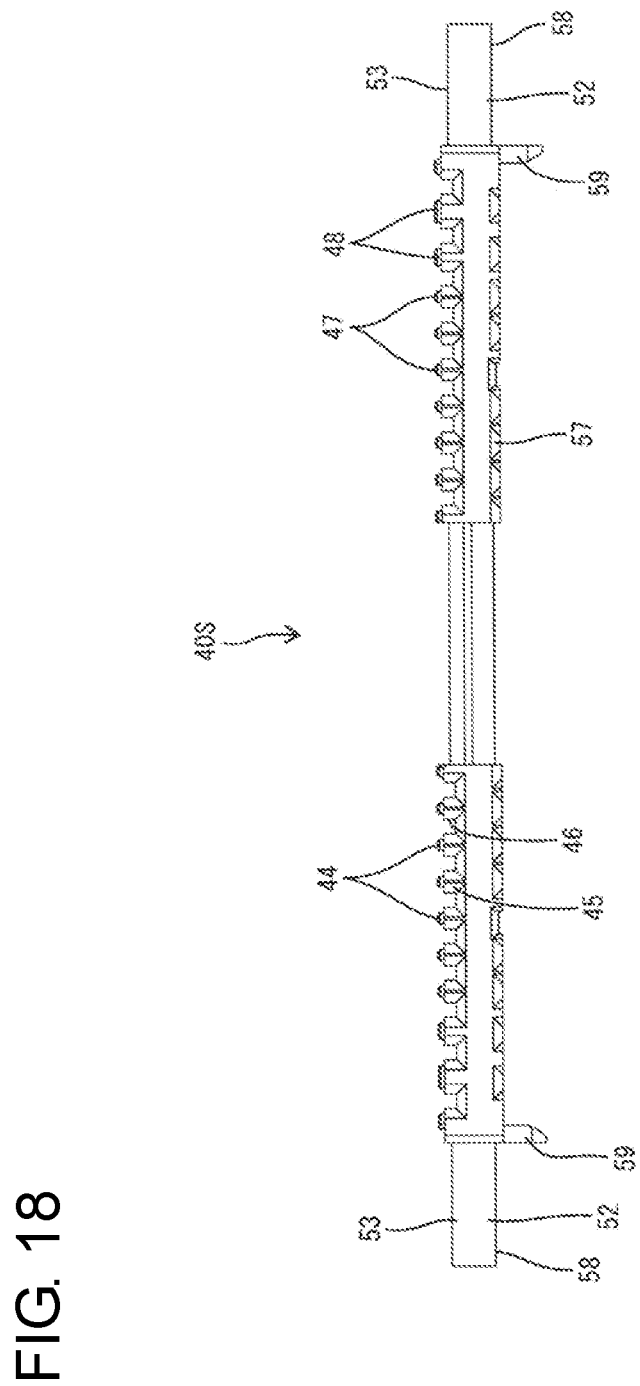
FIG. 18 is a front view showing the second split housing.
Figure 19:
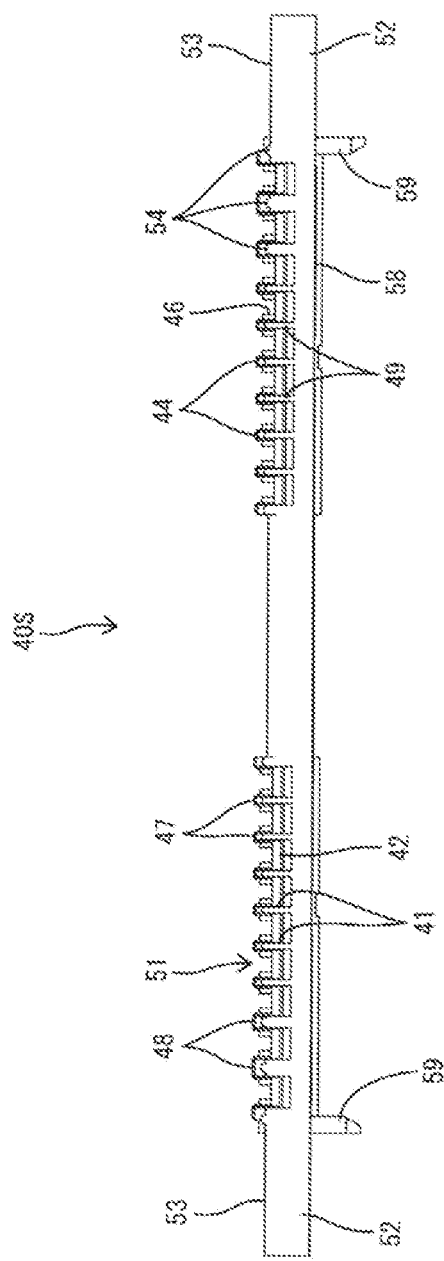
FIG. 19 is a back view showing the second split housing.
Figure 20:
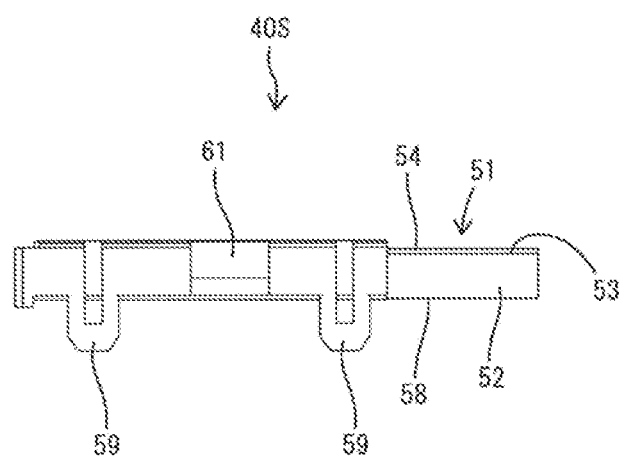
FIG. 20 is a side view showing the second split housing.

As shown in FIG. 16, partition walls 44 for partitioning between the cavities 41 in the upper stage and front walls 45 of the cavities 41 stand on the upper surface of the second split housing 40S.

Similar to the first split housing 40F, the front walls 45 have a smaller height than the partition walls 44, and terminal insertion openings 46 into which the mating terminal fittings are inserted are open on an upper surface side.

Similar to the first split housing 40F, a rear end part of the partition wall 44 is formed into a lower wall 49 having a slightly smaller height than a front part, and an upper side of the lower wall 49 constitutes a sheet arranging portion 51. Further, similar to the first split housing 40F, the partition walls 44 include thin walls 47 disposed in parts where intervals between adjacent cavities 41 are narrow and thick walls 48 disposed in parts where intervals between adjacent cavities 41 are wide.

Similar to the first split housing 40F, bulging portions 52 protrude laterally on a rear end part of the second split housing 40S and have a rectangular shape in a plan view. Similar to the first split housing 40F, the upper surfaces of the bulging portions 52 serve as sheet placing surfaces 53. Similar to the first split housing 40F, protrusions 54 project on the upper surfaces of the sheet placing surfaces 53 and the lower walls 49 of the thick walls 48.

Front wall constituting portions 57 are provided on the lower surface of the second split housing 40S and form parts of the front walls of the cavities 41 in the lower stage. The front wall constituting portions 57 close the upper surface sides of the terminal insertion openings 46 with the first and second split housings 40F, 40S united.

A sheet pressing portion 58 is provided on a rear end part of the second split housing 40S for pressing the sheet 30 arranged on the sheet arranging portion 51 of the first split housing 40F. The sheet pressing portion 58 is a substantially entirely flat surface constituting the lower surface of the rear part of the second split housing 40S and extends over substantially the entire width of the second split housing 40S including the bulging portions 52.

Figure 5:
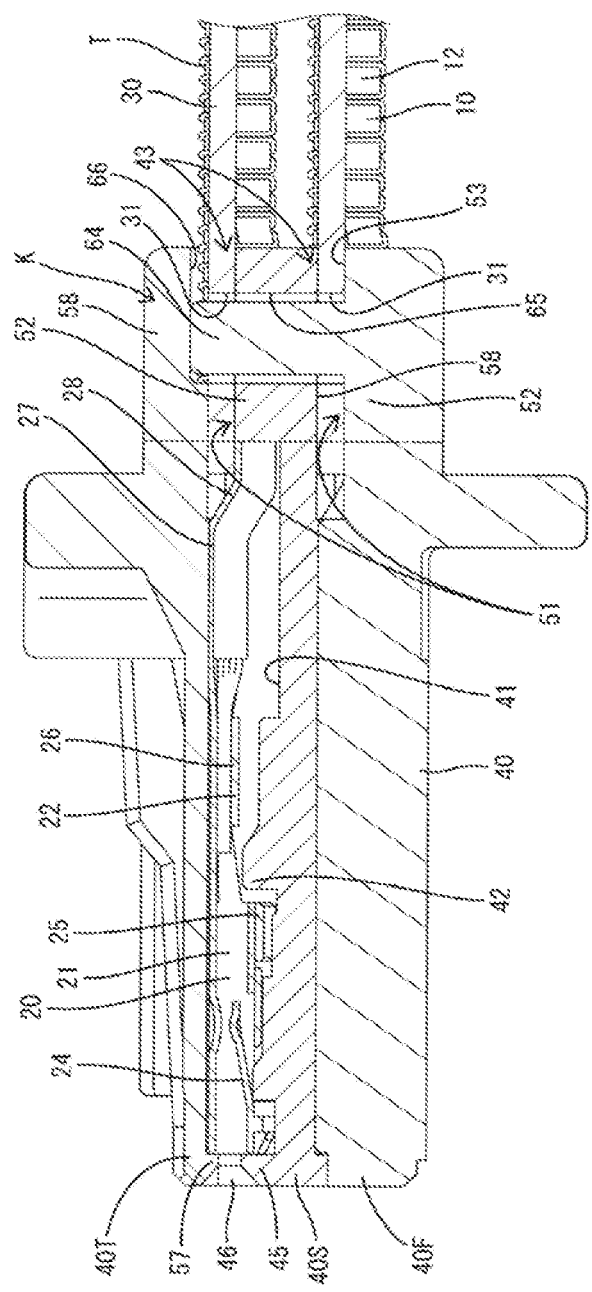
FIG. 5 is a section showing locking structures of a housing and sheet-like members.

The sheet arranging portion 51 of the first split housing 40F and the sheet pressing portion 58 of the second split housing 40S constitute the sheet sandwiching portion 43 for vertically sandwiching the front edge part of the sheet 30 in the lower stage (see FIG. 5).

As shown in FIG. 2, lock pieces 59 and a lock receiver 61 constituting the lock structure R are provided on left and right side surfaces of the second split housing 40S. The lock pieces 59 are locked to the lock projections 56 of the first split housings 40F, and two of the lock pieces 59 are cantilevered to project down on each of front and rear sides of the second split housing 40S. A lock claw 63 of the third split housing 40T to be described later is locked to the lock receiver 61, which is provided between a pair of the lock pieces 59.

Figure 21:
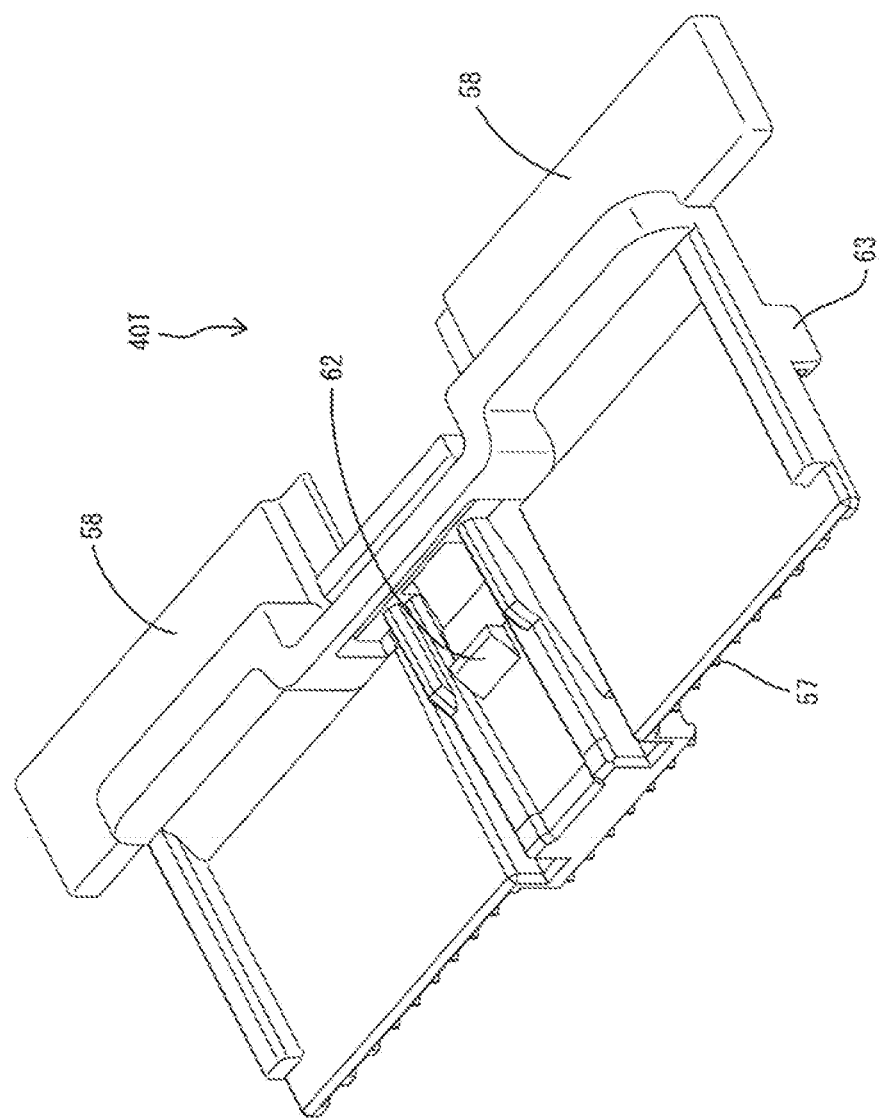
FIG. 21 is a perspective view showing a third split housing.
Figure 22:
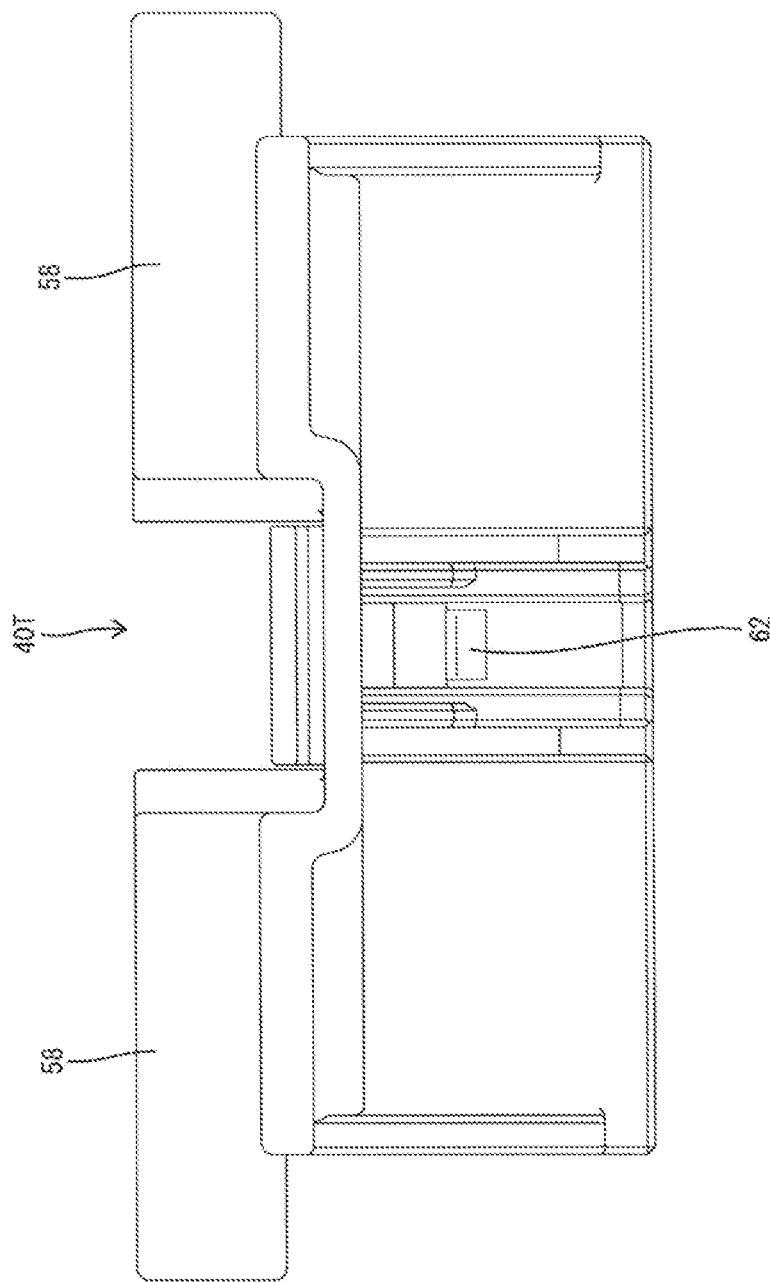
FIG. 22 is a plan view showing the third split housing.
Figure 23:
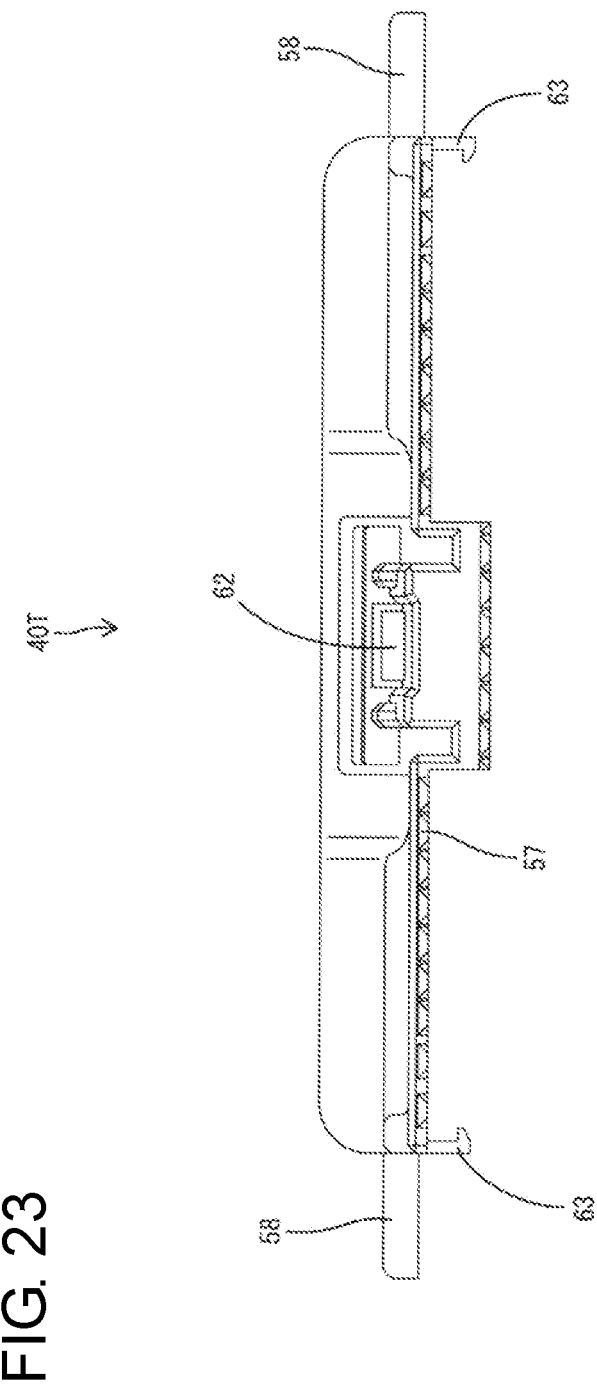
FIG. 23 is a front view showing the third split housing.

As shown in FIG. 21, the third split housing 40T is in the form of a lid for closing an upper surface side of the second split housing 40S.

A lock 62 for holding an unillustrated mating connector in a properly connected state is provided on the upper surface of the third split housing 40T. The lock 62 is provided in a widthwise central part of the third split housing 40T.

Front wall constituting portions 57 are provided on the lower surface of the third split housing 40T and constitute parts of front walls of the cavities 41 in the upper and lower stages. The front wall constituting portions 57 in a widthwise central part of the third split housing 40T constitute the front walls of the cavities 41 in the lower stage, and the front wall constituting portions 57 in both widthwise end parts constitute the front walls of the cavities 41 in the upper stage.

Sheet pressing portions 58 protrude on the rear end part of the third split housing 40T and press the sheet 30 in the upper stage. The sheet pressing portions 58 are plates having at least a flat lower surface. The sheet pressing portions 58 of the third split housing 40T are provided in parts corresponding to the cavities 41 in the upper stage and the bulging portions 52 of the second split housing 40S.

The sheet arranging portion 51 of the second split housing 40S and the sheet pressing portions 58 of the third split housing 40T constitute the sheet sandwiching portion 43 for vertically sandwiching the front edge part of the sheet 30 in the upper stage (see FIG. 5).

The lock claws 63 of the lock structures R are provided on both left and right side surfaces of the third split housing 40T. The lock claws 63 are locked to the lock receivers 61 of the second split housing 40S and cantilevered to project down.

The housing 40 and the sheet-like members 30 include the locking structures K to be fit and locked to each other, as shown in FIG. 5.

The locking structures K include cylindrical bosses 64 on the housing 40 and through holes 31 in the sheets 30. The bosses 64 stand substantially perpendicularly to the front-rear direction and are passed through the through holes 31 of the sheets 30. As shown in FIG. 2, two the bosses 64 are provided on both widthwise end parts of the housing 40, and two of the through holes 31 are provided in both widthwise end parts of each sheet 30.

Figure 24:
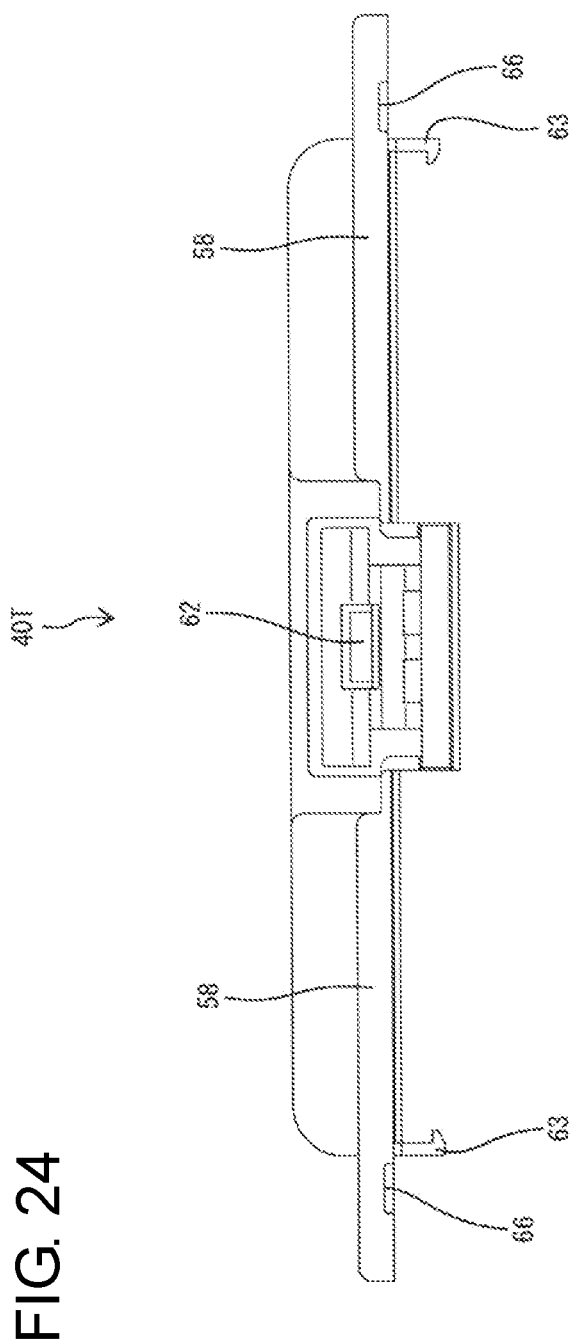
FIG. 24 is a back view showing the third split housing.
Figure 25:
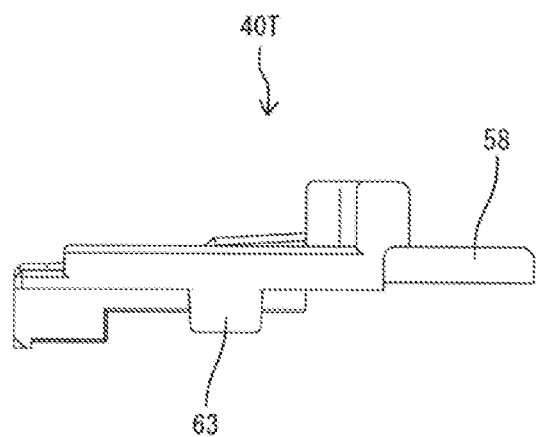
FIG. 25 is a side view showing the third split housing.
Figure 26:
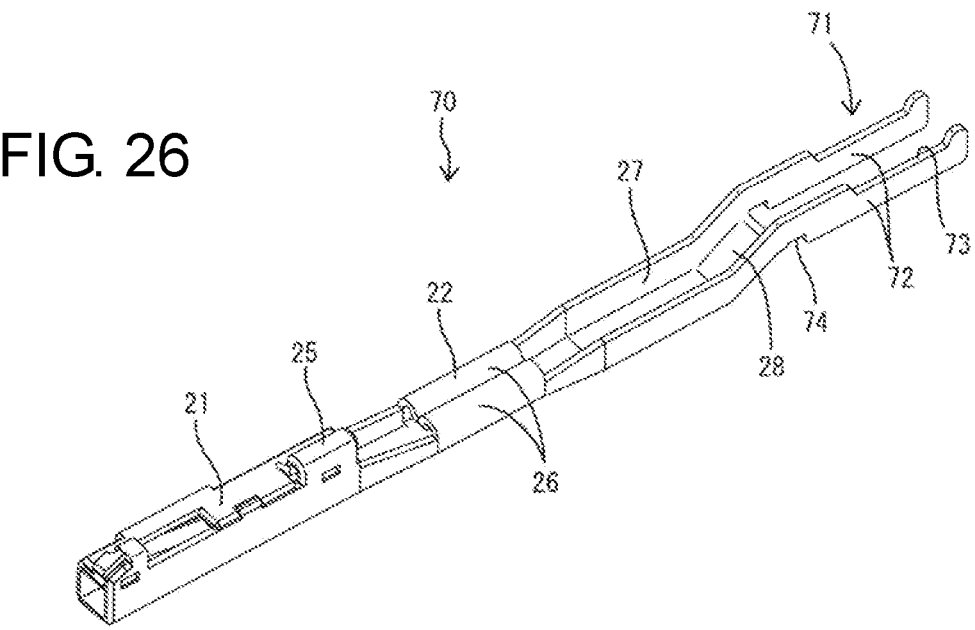
FIG. 26 is a perspective view showing a terminal fitting in a second embodiment.
Figure 27:
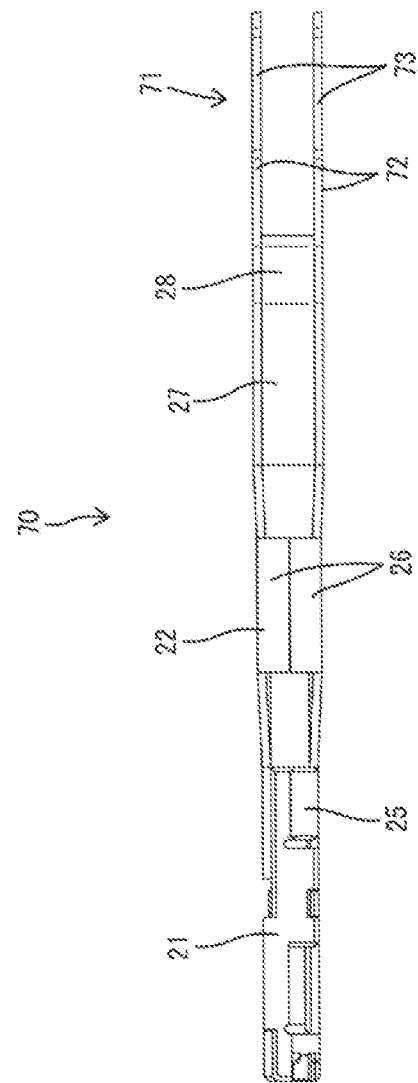
FIG. 27 is a plan view showing the terminal fitting.
Figure 28:
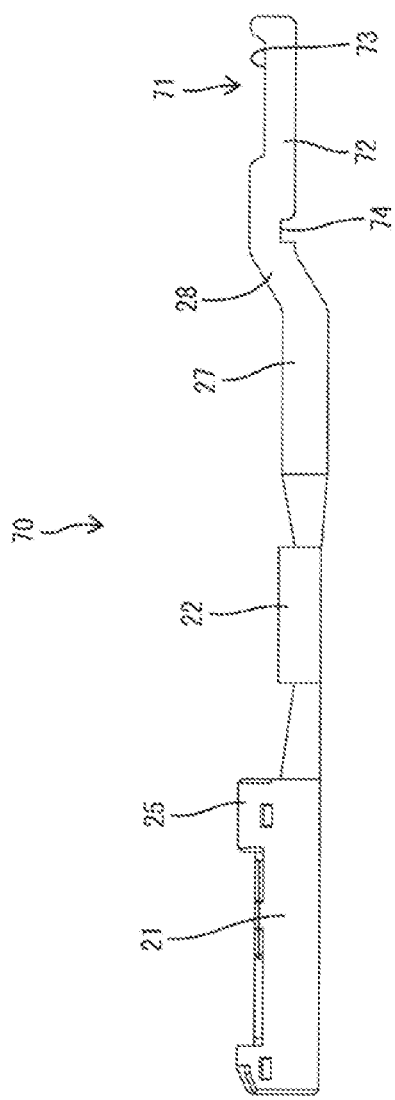
FIG. 28 is a side view showing the terminal fitting.
Figure 29:
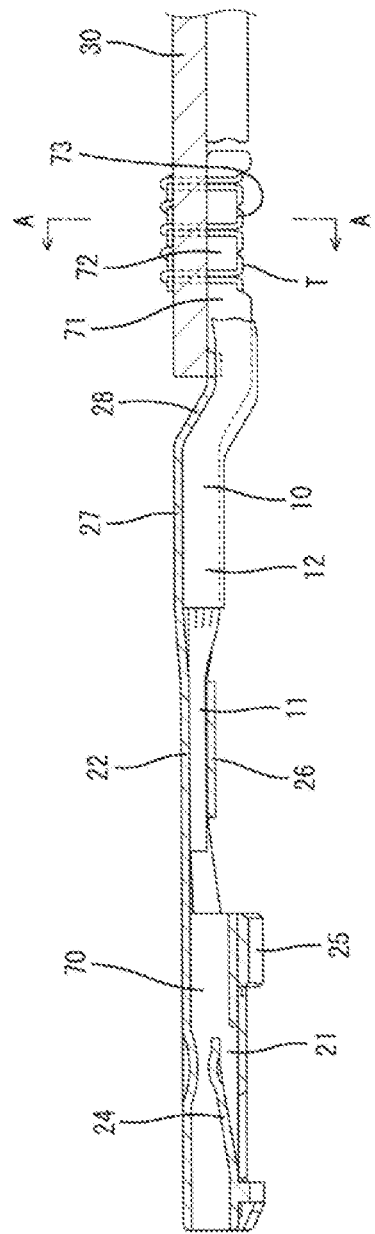
FIG. 29 is a section showing the terminal fitting in a state sewn to a sheet-like member.

As shown in FIG. 11, the bosses 64 stand on the sheet placing surfaces 53 of the first split housing 40F. The second split housing 40S is provided with through holes 65 through which the bosses 64 are passed, as shown in FIG. 16. The through holes 65 are circular and penetrate through the bulging portions 52 of the second split housing 40S. As shown in FIG. 24, the third split housing 40T is provided with recesses 66 into which upper end parts of the bosses 64 are fit. The recesses 66 are formed by recessing the lower surfaces of the sheet pressing portions 58 of the third split housing 40T.

With the first, second and third split housings 40F, 40S and 40T united, the bosses 64 standing on the first split housing 40F are passed through the through holes 65 of the second split housing 40S and reach the recesses 66 of the third split housing 40T, as shown in FIG. 5. The bosses 64 are passed through both the through holes 31 of the sheet-like member 30 in the upper stage and the through holes 31 of the sheet-like member 30 in the lower stage.

The through holes 31 penetrate through the sheet-like members 30 in a thickness direction and have a circular shape in conformity with the shape of the bosses 64. Two of the through holes 31 are provided in each sheet-like member 30 and are disposed at outer sides of the terminal fittings 20 located on both widthwise ends, out of the terminal fittings 20 sewn to each sheet 30. The through holes 31 are located laterally (direction orthogonal to the front-rear direction) side by side with the terminal sewing portions 23 and are at positions to be coaxially arrangeable in the two sheets 30.

Next, an example of an operation of assembling the wiring harness in this embodiment is described.

First, the terminal fittings 20 are connected to the end parts of the wires 10 by crimping the barrel pieces 26 of the terminal fittings 20 to the exposed cores 11 of the wires 10.

Subsequently, the wires 10 having the terminal fittings 20 connected thereto are sewn to the sheets 30. The terminal fittings 20 and the wires 10 are sewn to each of the two sheets 30 by a sewing machine or the like.

Subsequently, the terminal fittings 20 are accommodated into the housing 40.

The housing 40 is split and the terminal fittings 20 are accommodated into the cavities 41 of the first split housing 40F from above. At this time, the terminal fittings 20 are accommodated so that the lock receiving portions 25 of the respective terminal fittings 20 are located in front of the retaining portions 42 of the respective cavities 41. Since all the terminal fittings 20 are sewn to the sheet 30 in accordance with the positions of the respective cavities 41, the terminal fittings 20 can be accommodated collectively into the cavities 41. Further, the bosses 64 of the first split housing 40F are passed through the through holes 31 of the sheet 30. The front edge part of the sheet 30 is disposed on the sheet arranging portion 51 of the first split housing 40F.

Subsequently, the second split housing 40S is mounted on the upper surface of the first split housing 40F. The front wall constituting portions 57 of the second split housing 40S are united with the front walls 45 of the first split housing 40F, and the upper surface sides of the cavities 41 of the first split housing 40F are closed by the second split housing 40S. The bulging portions 52 of the second split housing 40S are disposed above the bulging portions 52 of the first split housing 40F, and the bosses 64 are inserted into the through holes 65. The sheet pressing portion 58 of the second split housing 40S is disposed above the front edge part of the sheet-like member 30 disposed on the sheet arranging portion 51 of the first split housing 50F to sandwich the sheet 30. The lock structures R are locked and the first and second split housings 40F, 40S are held united. At this time, the bosses 64 of the first split housing 40F project up through the bulging portions 52 of the second split housing 40S.

Subsequently, the terminal fittings 20 are accommodated into the cavities 41 of the second split housing 40S from above. As described above, the terminal fittings 20 are accommodated so that the lock receiving portions 25 of the respective terminal fittings 20 are located in front of the retaining portions 42 of the respective cavities 41. Further, the bosses 64 projecting from the bulging portions 52 of the second split housing 40S are passed through the through holes 31 of the sheet 30. The front edge part of the sheet 30 is disposed on the sheet arranging portion 51 of the second split housing 40S.

Subsequently, the third split housing 40T is mounted on the upper surface of the second split housing 40S. The front wall constituting portions 57 of the third split housing 40T are united with the front walls 45 of the second split housing 40S or the front walls 45 of the first split housing 40F. Thus, the upper surface sides of the cavities 41 of the second and first split housings 40S, 40F are closed by the third split housing 40T. The sheet pressing portions 58 of the third split housing 40T are disposed above the front edge of the sheet 30 disposed on the sheet arranging portion 51 of the second split housing 40S to sandwich the sheet 30. The recesses 66 of the third split housing 40T are fit to tip parts of the bosses 64 projecting up from the sheets 30. The lock structures R are locked and the third split housing 40T and the second split housing 40S are held united.

In the above way, the assembling operation of the wiring harness is completed.

The wiring harness of this embodiment includes the wires 10 and the terminal fittings 20 connected to the end parts of the respective wires 10, and the wires 10 and the wire arranging portions 27 of the terminal fittings 20 are sewn to the sheets 30. Accordingly, the wires 10 are sewn directly to the sheet 30, hence the wires 10 cannot e pulled singly. Further, if the wires 10 are pulled together with the sheet 30, a pulling force acting on the wires 10 can be reduced since the pulling force can be dispersed to the wires 10 and the sheet 30. In addition, since at least the wire arranging portions 27 of the terminal fittings 20 along which the wires 10 are disposed are sewn to the sheets 30, the detachment of the terminal fittings 20 from the wires 10 can be prevented. Therefore, the wires 10 can be protected.

Further, the wires 10 and the terminal fittings 20 are sewn collectively to the sheet 30. Since the wires 10 and the terminal fittings 20 can be handled collectively handled, this configuration is advantageous particularly when individual handling of the wires 10 and the terminal fittings 20 is difficult because the wires 10 are thin and the terminal fittings 20 are small.

Further, the wiring harness includes the housing 40 for accommodating the terminal fittings 20, and the housing 40 and the sheets 30 include the locking structures K to be fit and locked to each other. According to this configuration, a pulling force on the wires 10 and the sheet 30 is transferred to the housing 40. Thus, the pulling force acting on the wires 10 is reduced further.

Second Embodiment

A wiring harness according to a second embodiment of the invention is described with reference to FIGS. 26 to 30.

The wiring harness of this embodiment differs from the first embodiment in that a terminal sewing portion 71 of a terminal fitting 70 includes sewing ribs 72. Note that components similar to those of the first embodiment are denoted by the same reference signs and repeated description is omitted.

As in the first embodiment, the wiring harness according to this embodiment includes wires 10, the terminal fittings 70 connected respectively to end parts of each wire 10, and sheets 30 to which the wires 10 and wire arranging portions 27 of the terminal fittings 70 are sewn to.

As in the first embodiment, the terminal fitting 20 includes a terminal body 21 and a connecting portion 22. The wire arranging portion 27 is provided behind the connecting portion 22 and a step 28 is provided in an intermediate part of the wire arranging portion 27.

A part of the wire arranging portion 27 behind the step 28 serves as the terminal sewing portion 71. The terminal sewing portion 71 includes two sewing ribs 72 that are long in a front-rear direction. The sewing ribs 72 extend rearward from both widthwise ends of the step 28 and are symmetrical with respect to an axis of the terminal fitting 70. Additionally, the sewing ribs 72 are substantially parallel to each other, and plate surfaces thereof stand perpendicularly to one surface of the sheet 30.

A recess 73 is formed on a side of each sewing rib 72 opposite to a side where the sheet 30 is disposed. A part of the sewing rib 72 where the recess 73 is formed is sewn to the sheet 30 (see FIG. 29). Further, a square cutout portion 74 is formed in a front part of each sewing rib 72 (behind the step 28). The cutout portion 74 is formed on the side where the sheet 30 is disposed.

Figure 30:
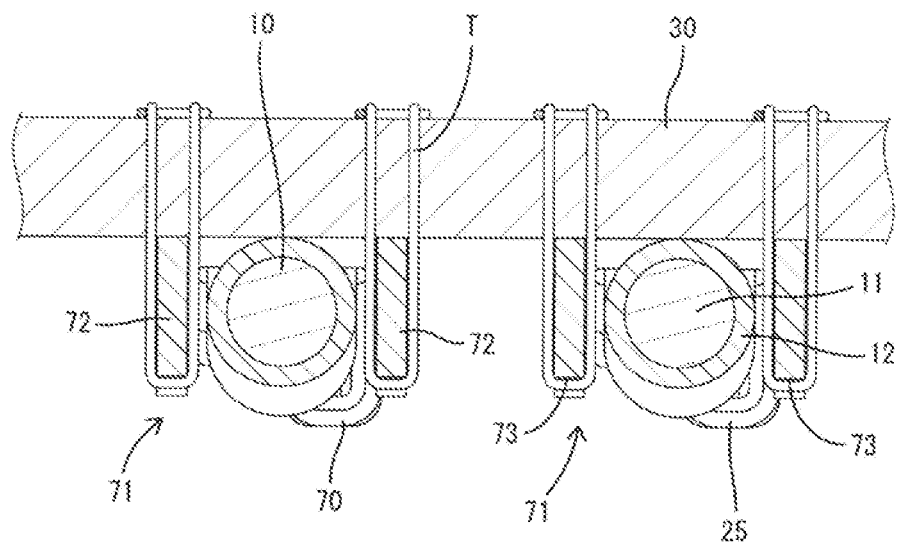
FIG. 30 is a section, corresponding to a cross-section at position A-A of FIG. 29, showing the terminal fitting in the state sewn to the sheet-like member.

As shown in FIG. 30, the sewing ribs 72 are sewn one by one to the sheet 30. With the sewing ribs 72 sewn to the sheet 30, the wire 10 disposed between the sewing ribs 72 is in contact with the one surface of the sheet 30.

As described above, in this embodiment, the wires 10 and the wire arranging portions 27 of the terminal fittings 70 are sewn to the sheet 30, as in the first embodiment. Thus, a pulling force on the wires 10 can be reduced and the detachment of the wires 10 from the terminal fittings 70 can be prevented.

Third Embodiment

Figure 31:
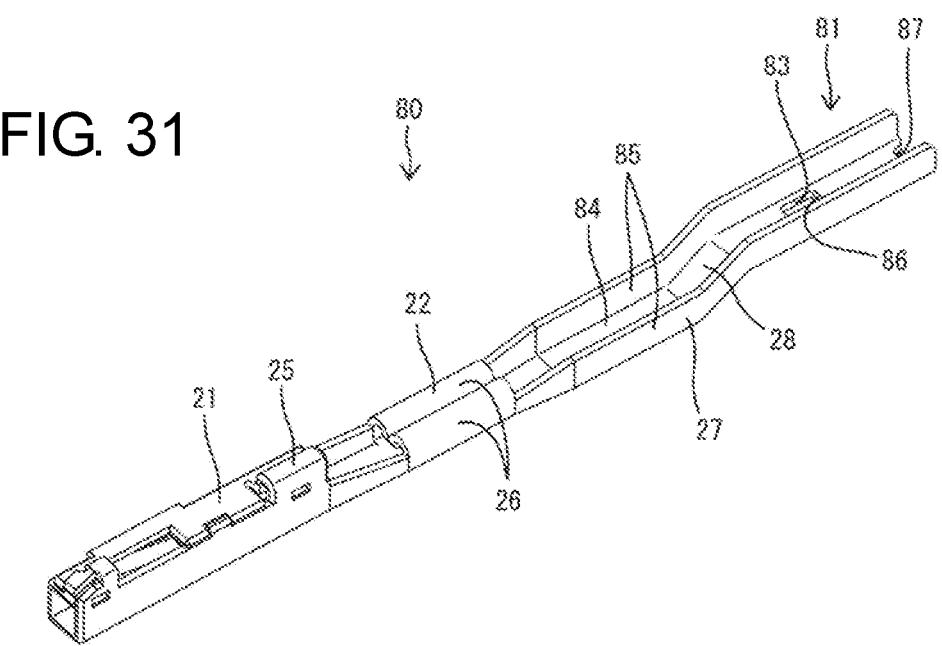
FIG. 31 is a perspective view showing a terminal fitting in a third embodiment.
Figure 32:
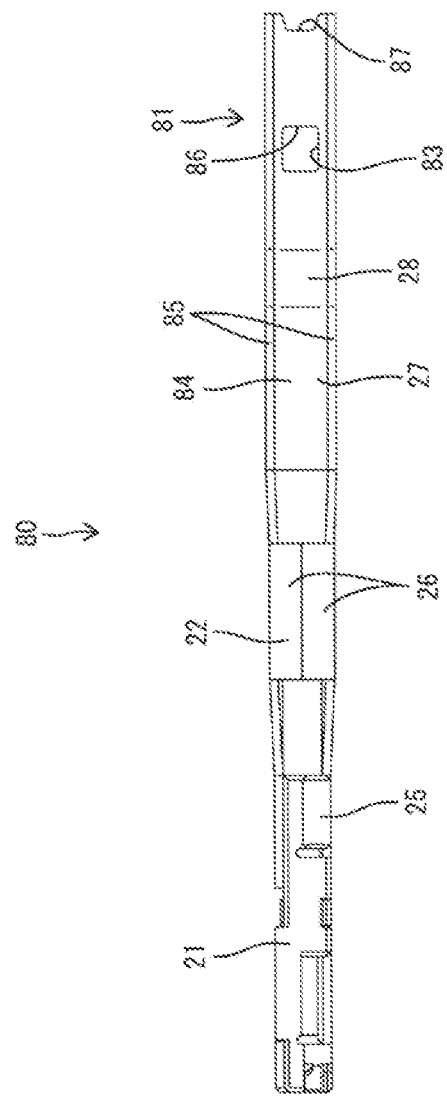
FIG. 32 is a plan view showing the terminal fitting.

A wiring harness according to a third embodiment of the invention is described with reference to FIGS. 31 to 33.

The wiring harness of this embodiment differs from the first embodiment in that a terminal sewing portion 81 of a terminal fitting 80 includes a sewing hole 83. Note that components similar to those of the first embodiment are denoted by the same reference signs and repeated description is omitted.

As in the first embodiment, the wiring harness according to this embodiment includes wires 10, terminal fittings 80 connected respectively to end parts of the wires 10, and sheets 30 sewn to the wires 10 and wire arranging portions 27 of the terminal fittings 80.

As in the first embodiment, the terminal fitting 80 includes a terminal body 21 and a connecting portion 22. The wire arranging portion 27 is provided behind the connecting portion 22 and a step 28 is provided in an intermediate part of the wire arranging portion 27.

The wire arranging portion 27 includes a bottom plate 84 and side plates 85 standing substantially vertically from both left and right sides of the bottom plate 84. The sheet 30 is disposed on one surface of the bottom plate 84 (side where the side plates 85 do not stand), and the side plates 85 stand substantially perpendicularly to one surface of the sheet 30.

A part of the wire arranging portion 27 behind the step 28 serves as the terminal sewing portion 81, and the sewing hole 83 is provided in the bottom plate 84 of the terminal sewing portion 81. As shown in FIG. 32, the sewing hole 83 has a substantially square shape in a plan view and penetrates through the bottom plate 84 in a plate thickness direction. The sewing hole 83 extends substantially over the entire width of the bottom plate 84.

The sewing hole 83 is slightly before a center of the terminal sewing portion 81 in the front-rear direction. A rear edge 86 of the sewing hole 83 is located substantially at the center of the terminal sewing portion 81 in the front-rear direction and substantially orthogonal to the front-rear direction.

A hooking recess 87 is provided in a rear end part of the terminal fitting 80. The hooking recess 87 is formed by recessing the rear end of the bottom plate 84 to be located slightly before the rear ends of the side plates 85.

Figure 33:
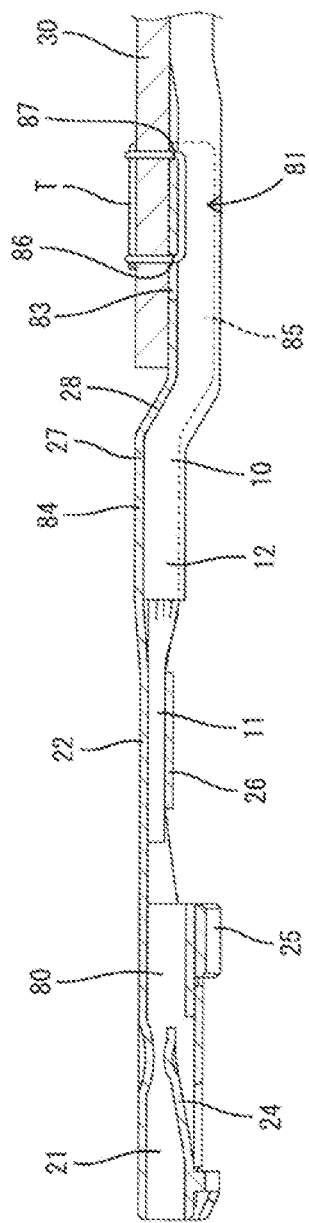
FIG. 33 is a section showing the terminal fitting in a state sewn to a sheet-like member.
Figure 34:
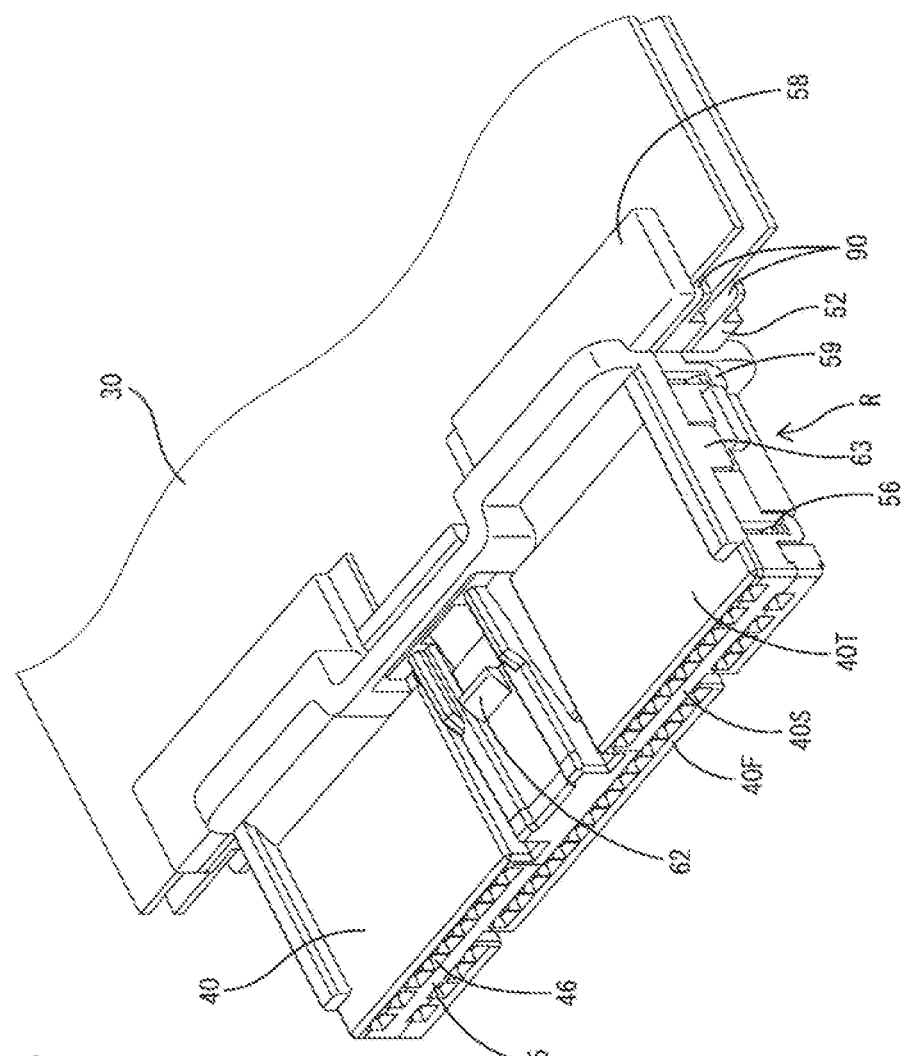
FIG. 34 is a perspective view showing an end part of a wiring harness in a fourth embodiment.
Figure 35:
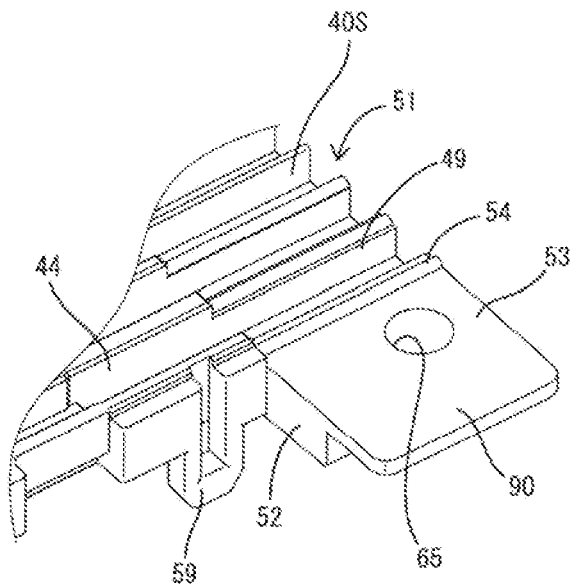
FIG. 35 is a partial enlarged perspective view showing a sewing portion of a housing.

As shown in FIG. 33, a part of the terminal sewing portion 81 behind the sewing hole 83 is sewn to the sheet 30. A sewing thread T is threaded between the rear edge 86 of the sewing hole 83 and the hooking recess 87.

As described above, in this embodiment, the wires 10 and the wire arranging portions 27 of the terminal fittings 80 are sewn to the sheet-like member 30 as in the first embodiment. Thus, a pulling force acting on the wires 10 can be reduced and the detachment of the wires 10 from the terminal fittings 80 can be prevented.

Fourth Embodiment

A wiring harness according to a fourth embodiment of the invention is described with reference to FIGS. 34 to 39.

The wiring harness of this embodiment differs from the first embodiment in that a housing 40 includes housing sewing portions 90 to be sewn to sheets 30. Note that components similar to those of the first embodiment are denoted by the same reference signs and repeated description is omitted.

As in the first embodiment, the wiring harness according to this embodiment includes wires 10, terminal fittings 20 connected respectively to end parts of the wires 10, and sheets 30 sewn to the wires 10 and wire arranging portions 27 of the terminal fittings 20. Further, as in the first embodiment, the wiring harness includes the housing 40 for accommodating the terminal fittings 20, and the housing 40 includes a first split housing 40F, a second split housing 40S and a third split housing 40T.

The housing 40 includes the housing sewing portions 90 to be sewn to the sheets 30. The housing sewing portions 90 project out from a rear end part of the housing 40 behind connecting portions 22 of the terminal fittings 20. Each housing sewing portion 90 is a thin plate and disposed along one surface of the sheet 30 and a sewing machine needle can be passed therethrough in a thickness direction.

The housing sewing portions 90 protrude on both left and right sides of the rear end part of the housing 40 and are provided respectively on the first and second split housings 40F, 40S. The housing sewing portions 90 are formed by thinning parts of bulging portions 52 (end parts of the bulging portions 52 except parts where bosses 64 or through holes 65 are formed). The upper surface of each housing sewing portion 90 constitutes a sheet placing surface 53.

Figure 36:
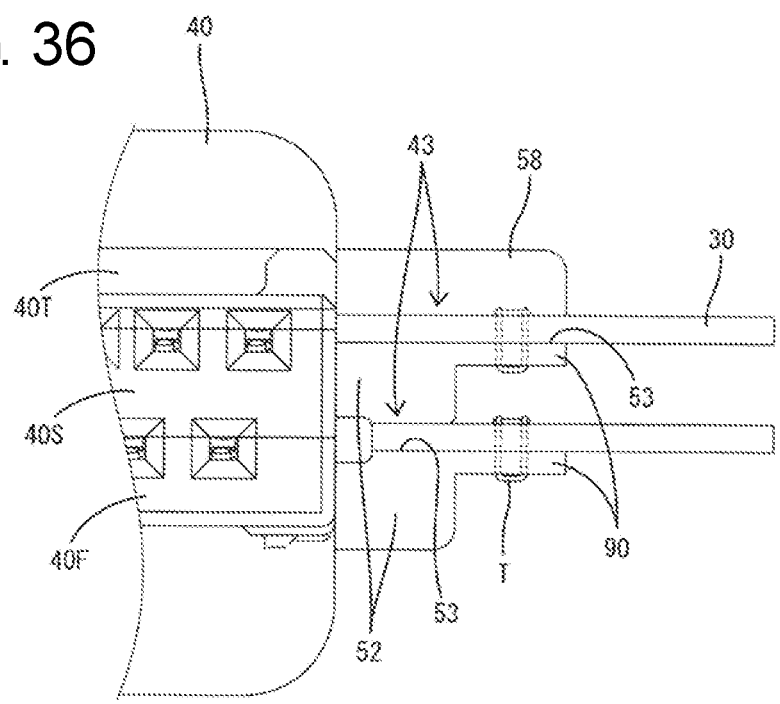
FIG. 36 is a partial enlarged front view showing the end part of the wiring harness in a state where the housing is sewn to a sheet-like member.
Figure 37:
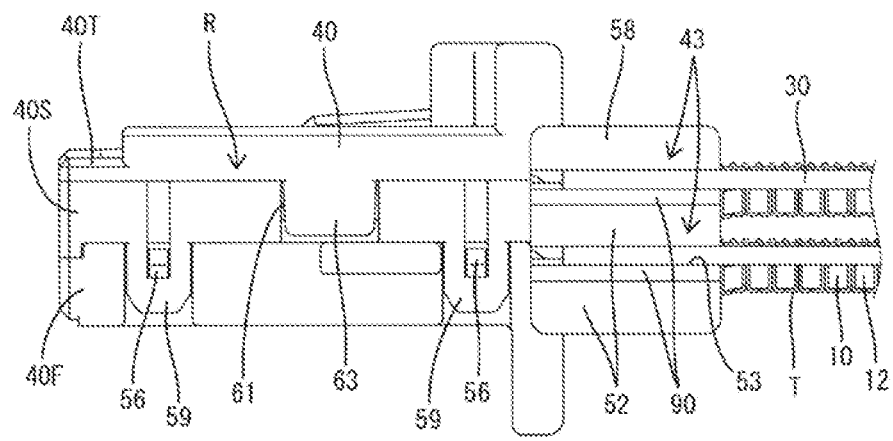
FIG. 37 is a side view showing the end part of the wiring harness in the state where the housing is sewn to the sheet-like member.
Figure 38:
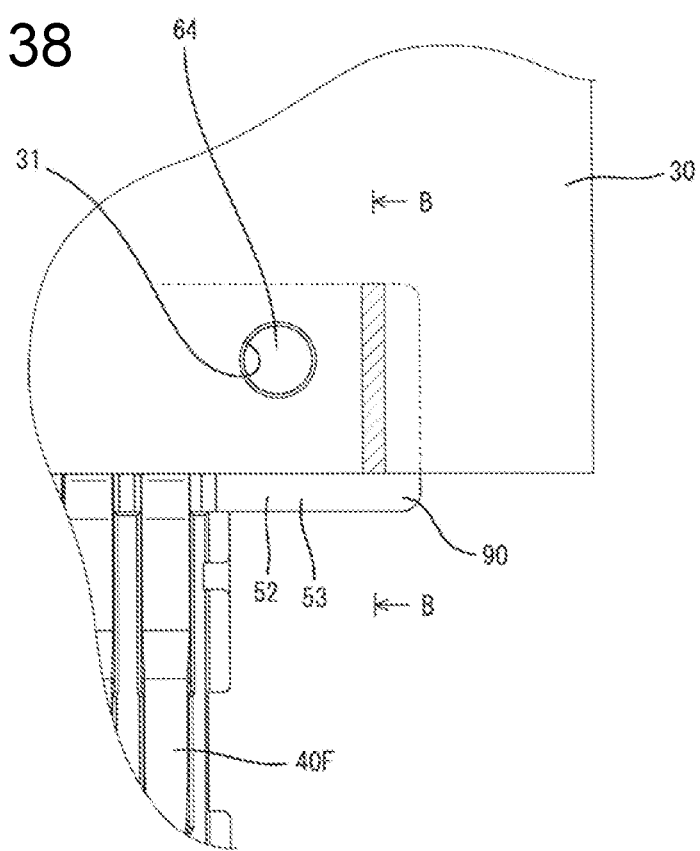
FIG. 38 is a partial enlarged plan view of a second split housing in a state sewn to the sheet-like member.
Figure 39:
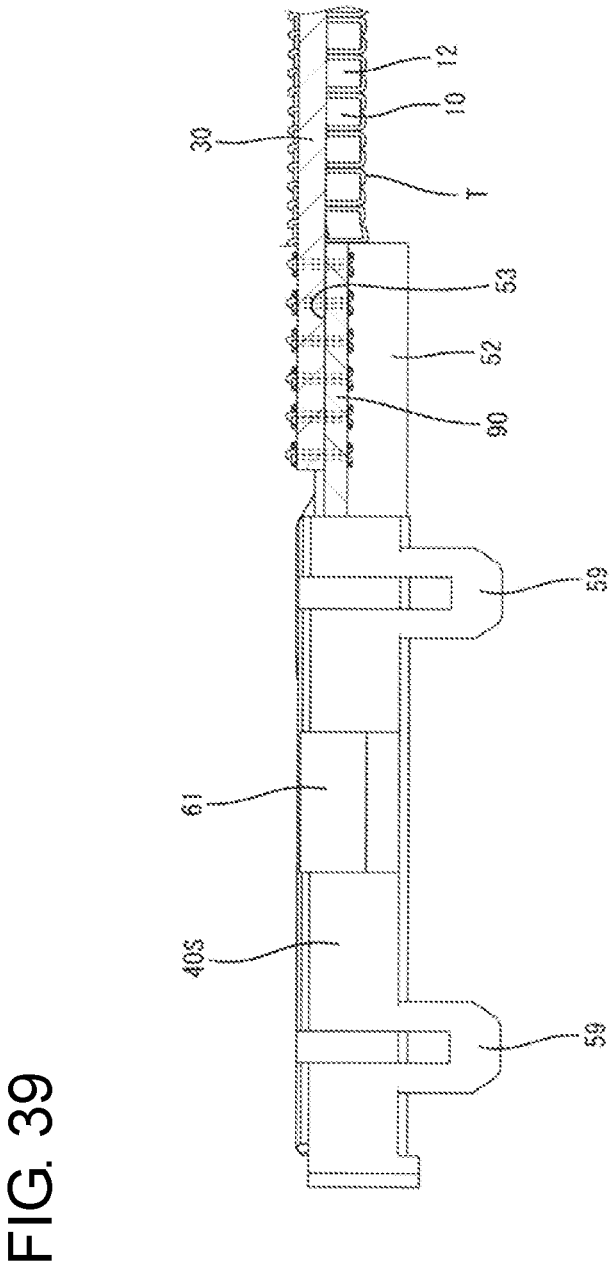
FIG. 39 is a section, corresponding to a cross-section at position B-B of FIG. 38, showing the second split housing in the state sewn to the sheet-like member.

As shown in FIG. 36, a sewing thread T is passed through the housing sewing portion 90 in the thickness direction to sew the housing sewing portion 90 together with the sheet 30 placed on the sheet placing surface 53. As shown in FIG. 38 or 39, the sewing thread T sews a part of the housing sewing portion 90 straight in the front-rear direction from a position slightly behind the front edge of the housing sewing portion 90 to the rear end of the housing sewing portion 90.

As described above, in this embodiment, the wires 10 and the wire arranging portions 27 of the terminal fittings 20 are sewn to the sheet 30 as in the first embodiment. Thus, a pulling force acting on the wires 10 can be reduced and the detachment of the wires 10 from the terminal fittings 20 can be prevented. In addition, since the housing 40 is sewn to the sheet-like member 30, a pulling force acting on the wires 10 and the sheet 30 is transferred to the housing 40 so that the pulling force acting on the wires 10 can be reduced further.

Fifth Embodiment

Figure 40:
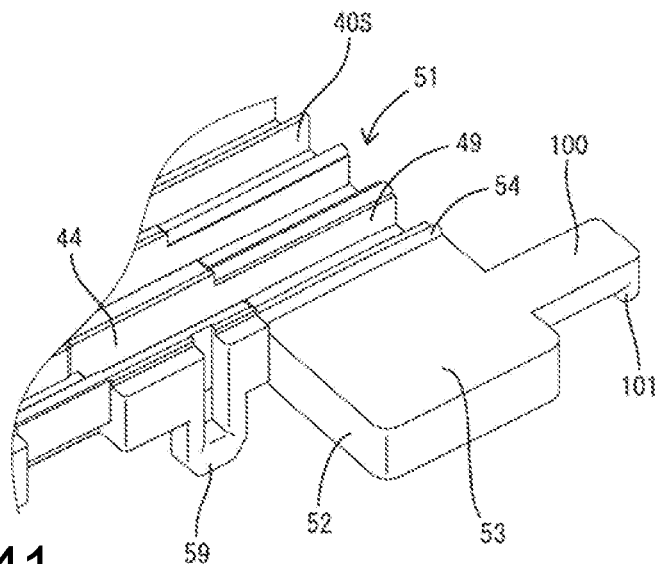
FIG. 40 is a partial enlarged perspective view showing a housing sewing portion in a fifth embodiment.

A wiring harness according to a fifth embodiment of the invention is described with reference to FIGS. 40 to 42.

The wiring harness of this embodiment differs from the first embodiment in that a housing 40 includes housing sewing portions 100 to be sewn to sheet-like members 30. Note that components similar to those of the first embodiment are denoted by the same reference signs and repeated description is omitted.

As in the first embodiment, the wiring harness according to this embodiment includes wires 10, terminal fittings 20 connected respectively to end parts of the wires 10, and sheets 30 sewn to the wires 10 and wire arranging portions 27 of the terminal fittings 20. Further, as in the first embodiment, the wiring harness includes the housing 40 for accommodating the terminal fittings 20, and the housing 40 includes a first split housing 40F, a second split housing 40S and a third split housing 40T.

The housing 40 includes the housing sewing portions 100 to be sewn to the sheets 30. The housing sewing portions 100 are ribs that cantilever rearward from a rear end part of the housing 40 and that are substantially parallel to a pull-out direction of the wires 10 from the rear end of the housing 40. Free ends of the housing sewing portions 100 have rectangular shapes long in the front-rear direction in a plan view. A hooking protrusion 101 is provided on a rear end part of the housing sewing portion 100 and projects down.

The housing sewing portions 100 are provided on each of the first and second split housings 40F, 40S and project rearward from the rear ends of bulging portions 52. The housing sewing portion 100 is provided substantially in a widthwise center of each bulging portion 52, and the upper surface of the housing sewing portion 100 constitutes a sheet placing surface 53.

Figure 41:
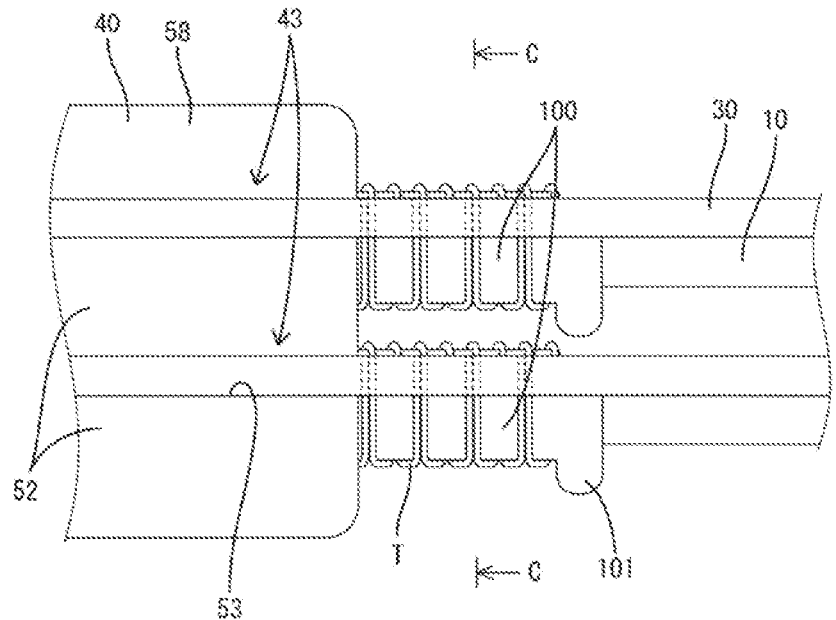
FIG. 41 is a partial enlarged side view showing an end part of a wiring harness in a state where the housing is sewn to a sheet-like member.
Figure 42:
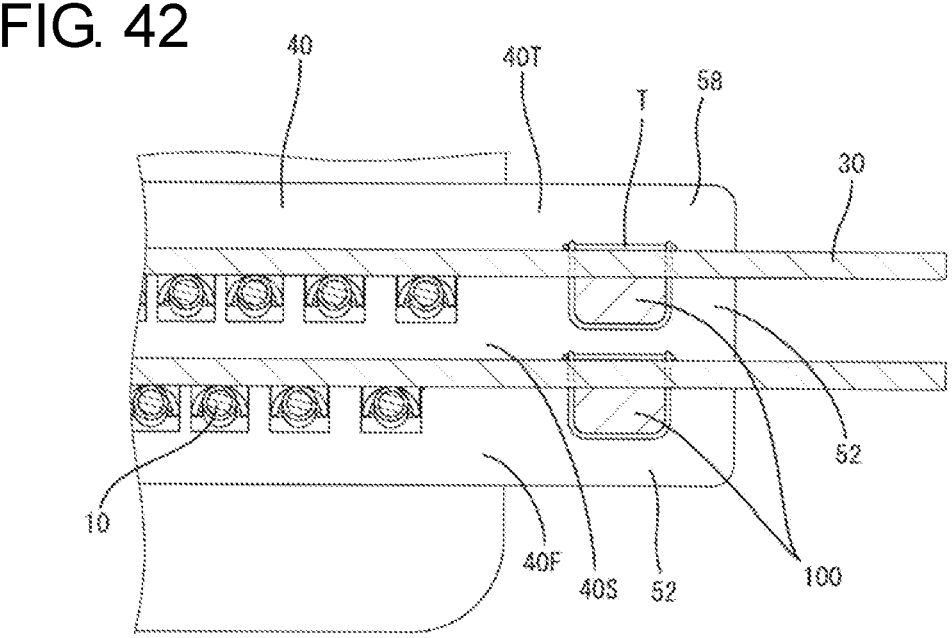
FIG. 42 is a partial enlarged section, corresponding to a cross-section at position C-C of FIG. 41, showing the end part of the wiring harness in the state where the housing is sewn to the sheet-like member.

As shown in FIG. 41, a sewing thread T sews the housing sewing portion 100 together with the sheet 30 placed on the sheet placing surface 53. The housing sewing portion 100 is sewn to the sheet 30 substantially over the entire length (substantially entirely between the bulging portion 52 and the hooking protrusion 101).

As described above, in this embodiment, the wires 10 and the wire arranging portions 27 of the terminal fittings 20 are sewn to the sheet 30 as in the first embodiment. Thus, a pulling force acting on the wires 10 can be reduced and the detachment of the wires 10 from the terminal fittings 20 can be prevented. In addition, since the housing 40 is sewn to the sheet 30, a pulling force acting on the wires 10 and the sheet 30 is transferred to the housing 40 so that the pulling force acting on the wires 10 is reduced further.

Sixth Embodiment

A wiring harness according to a sixth embodiment of the invention is described with reference to FIGS. 43 to 46.

The wiring harness of this embodiment differs from the first embodiment in that a housing 40 includes housing sewing holes 110 to be sewn to sheet-like members 30. Note that components similar to those of the first embodiment are denoted by the same reference signs and repeated description is omitted.

As in the first embodiment, the wiring harness according to this embodiment includes wires 10, terminal fittings 20 connected respectively to end parts of the wires 10, and sheets 30 sewn to the wires 10 and wire arranging portions 27 of the terminal fittings 20. Further, as in the first embodiment, the wiring harness includes the housing 40 for accommodating the terminal fittings 20, and the housing 40 includes a first split housing 40F, a second split housing 40S and a third split housing 40T.

The housing 40 includes the housing sewing holes 110 to be sewn to the sheets 30. The housing sewing holes 110 penetrate through the housing 40 in the same direction as a thickness direction of the sheets 30.

The housing sewing holes 110 are provided plate-like parts on both left and right sides of a rear end part of the housing 40.

Figure 43:
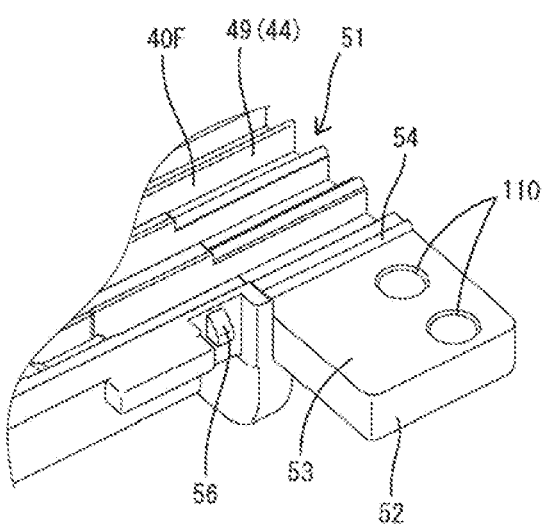
FIG. 43 is a partial enlarged perspective view showing an example of a housing sewing portion in a sixth embodiment.
Figure 45:
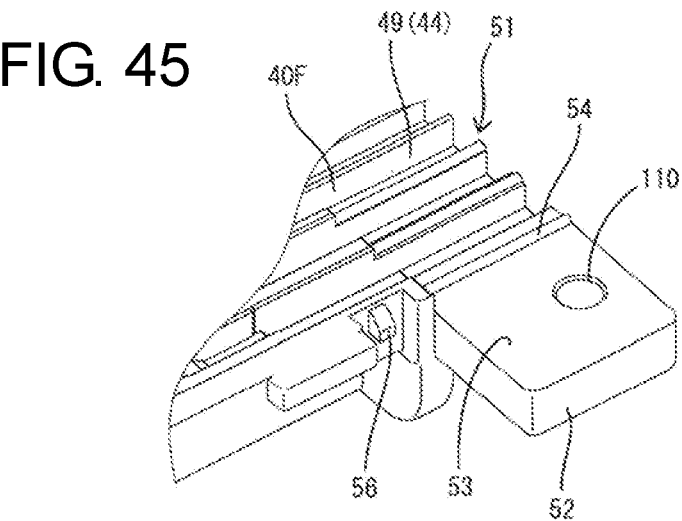
FIG. 45 is a partial enlarged perspective view showing another example of the housing sewing portion.

The housing sewing holes 110 are provided in bulging portions 52 of the first and second split housings 40F, 40S. The housing sewing holes 110 have substantially circular shapes in a plan view and penetrate through the bulging portion 52 in a plate thickness direction. The housing sewing holes 110 are located near the rear ends of the bulging portions 52. Two of the sewing holes 110 may be formed in each bulging portion 52, as shown in FIG. 43 or one housing sewing portion 110 may be formed in each bulging portion 52, as shown in FIG. 45. Note that three or more housing sewing holes 110 may be formed in the bulging portion 52.

Figure 44:
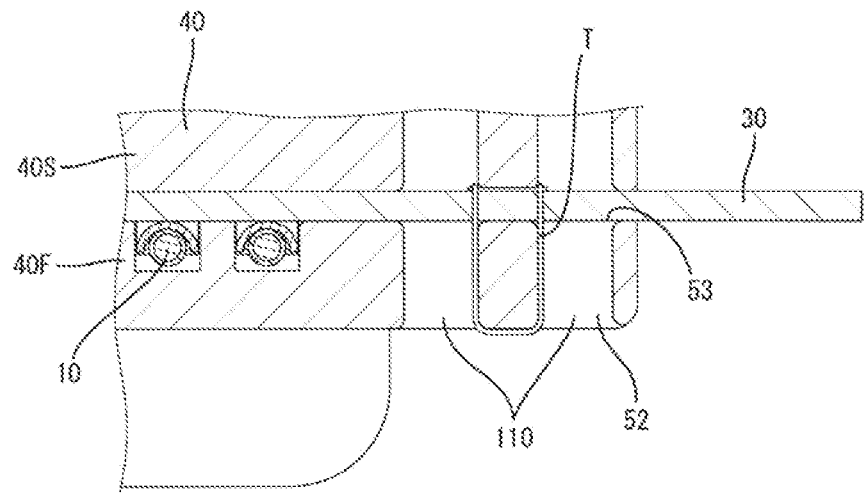
FIG. 44 is a partial enlarged section showing an end part of a wiring harness in a state where a housing is sewn to a sheet-like member.
Figure 46:
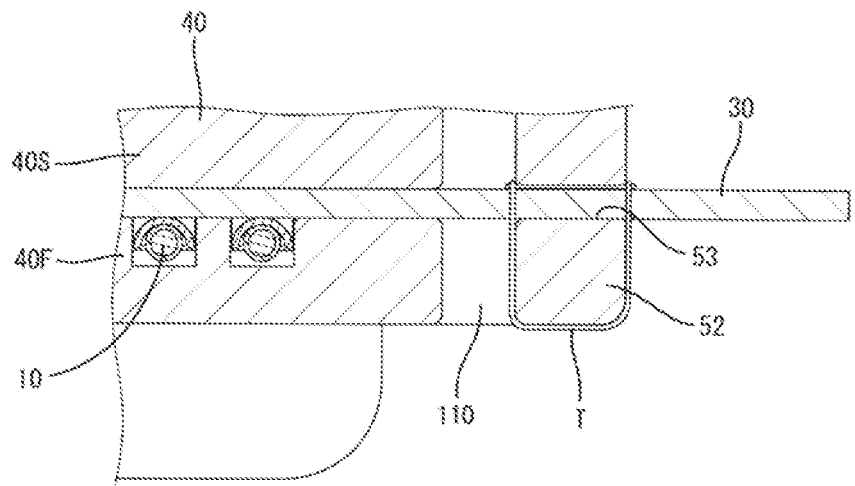
FIG. 46 is a partial enlarged section showing the end part of the wiring harness in the state where the housing is sewn to the sheet-like member.

Peripheral edge parts of the housing sewing holes 110 in the bulging portions 52 are sewn to the sheets 30. A sewing thread T may be threaded between adjacent housing sewing holes 110, for example, as shown in FIG. 44 or may be threaded between the housing sewing hole 110 and the outer peripheral surface of the bulging portion 52, for example, as shown in FIG. 46.

As described above, in this embodiment, the wires 10 and the wire arranging portions 27 of the terminal fittings 20 are sewn to the sheet 30 as in the first embodiment. Thus, a pulling force acting on the wires 10 can be reduced and the detachment of the wires 10 from the terminal fittings 20 can be prevented. In addition, since the housing 40 is sewn to the sheet 30, a pulling force acting on the wires 10 and the sheet 30 is transferred to the housing 40 so that the pulling force acting on the wires 10 can be reduced further.

The invention is not limited to the above described and illustrated embodiments. For example, the following embodiments also are included in the scope of the invention.

Although all the terminal fittings 20 accommodated in the cavities 41 in one stage are collectively sewn to the sheet 30 in the above embodiments, there is no limitation to this. For example, terminal fittings may be sewn one by one to a sheet or each group including a plurality of terminal fittings out of terminal fittings accommodated in cavities in one stage may be sewn to a sheet.

Although the cavities 41 of the housing 40 are arranged in two stages and the housing 40 is split into three in the above embodiments, there is no limitation to this. Cavities of a housing may be arranged in one, three or more stages, and a housing may be split into two, four or more.

Although the wires 10 having the terminal fittings 20 crimped thereto are sewn to the sheets 30 and the terminal fittings 20 are collectively accommodated into the split housings 40F, 40S to assemble the wiring harness in the above embodiments, there is no limitation to this. Terminal fittings before being crimped to wires may be accommodated into split housings, and the wires and the terminal fittings may be collectively connected to assemble a wiring harness, for example, by insulation displacement or welding with the wires in a state not crimped to the terminal fittings sewn to the sheets and the split housings and the sheets positioned.

Although the locking structures K of the housing 40 and the sheets 30 are provided in the parts located at both outer sides of the wires 10 in an arrangement direction in the first embodiment, there is no limitation to this. For example, locking structures may be provided in parts located between wires adjacent in an arrangement direction.

Although specific configurations (structures of the sewing portions, sewing positions and the like) in the case of sewing the housing 40 to the sheets 30 is illustrated in the above fourth, fifth and sixth embodiments, there is no limitation to this and a configuration for sewing a housing to a sheet can be changed appropriately. For example, although the first and second split housings 40F, 40S are sewn to the sheet in the above fourth, fifth and sixth embodiments, there is no limitation to this and the third split housing may be sewn to the sheet. Further, although the parts of the housing 40 at both outer sides of the wires 10 in the arrangement direction are sewn to the sheet 30, for example, in the fourth, fifth and sixth embodiments, there is no limitation to this and a part of a housing located between wires adjacent in an arrangement direction may be sewn to a sheet.

LIST OF REFERENCE SIGNS

K . . . locking structure
10 . . . wire
20, 70, 80 . . . terminal fitting
27 . . . wire arranging portion (part along which wires are disposed)
30 . . . sheet
40 . . . housing

The invention claimed is:
1. A wiring harness, comprising:
a wire;
a terminal fitting connected to an end part of the wire; and
a sheet, at least a part of the terminal fitting along which the wire is disposed being sewn to the sheet and a part of the wire extending from the terminal fitting being sewn to the sheet.
2. The wiring harness of claim 1, further comprising:
a housing for accommodating the terminal fitting, and wherein:
the housing is made of a synthetic resin and is sewn to the sheet.
3. The wiring harness of claim 1, wherein the sheet has a front edge, and the terminal fitting has a terminal body projecting forward from the front edge of the sheet, the terminal body being configured for connection to a mating terminal.
4. The wiring harness of claim 3, wherein the terminal fitting has a step between the terminal body and the front edge of the sheet, the step being configured so that a surface of the sheet opposite the wire is substantially flush with a surface of the terminal body.
5. The wiring harness of claim 1, wherein the part of the terminal fitting that is sewn to the sheet has a U-shaped cross-section that is open along a side facing away from the sheet, and the wire being positioned in the U-shaped part of the terminal fitting.
6. The wiring harness of claim 1, wherein the wire has a conductive core and an insulation coating covering at least part of the conductive core, the conductive core being exposed from the insulation coating at areas of the wire adjacent the end part of the wire, the terminal fitting being crimped to the conductive core exposed from the insulation coating of the wire.

7. The wiring harness of claim 6, wherein the insulation coating is on areas of the wire that are sewn to the sheet.

8. A wiring harness comprising:
a wire;
a terminal fitting connected to an end part of the wire;
a housing for accommodating the terminal fitting; and
a sheet, the wire and at least a part of the terminal fitting along which the wire is disposed being sewn to the sheet, wherein:
the housing and the sheet include locking structures to be fit and locked to each other.

9. The wiring harness of claim 8, wherein the housing is sewn to the sheet.

10. A wiring harness, comprising:
wires;
terminal fittings, each of the terminal fittings having opposite front and rear ends, a terminal body adjacent the front end of each of the terminal fittings and being configured for connection to a mating terminal fitting, a wire arranging portion adjacent the rear end of each of the terminal fittings, the wire arranging portions being connected respectively to front end parts of the wires so that the wires extend rearward from the terminal fittings; and
a sheet, at least a part of the wire arranging portion of each of the terminal fittings along which the respective wires are disposed and areas of each of the wires rearward of the terminal fitting being sewn to the sheet.

11. The wiring harness of claim 10, further comprising:
a housing accommodating the terminal fittings, wherein:
the housing and the sheet include locking structures to be fit and locked to each other.

12. The wiring harness of claim 11, wherein the housing is sewn to the sheet.

13. The wiring harness of claim 10, further comprising:
a housing accommodating the terminal fittings, and wherein:
the housing is sewn to the sheet.

* * * * *